(12) United States Patent
Suto et al.

(10) Patent No.: US 11,489,400 B2
(45) Date of Patent: Nov. 1, 2022

(54) METHOD FOR PRODUCING MOTOR DEVICE

(71) Applicant: MITSUBA Corporation, Gunma (JP)

(72) Inventors: Masashi Suto, Gunma (JP); Yuichi Takamura, Gunma (JP); Naoki Ogata, Gunma (JP)

(73) Assignee: MITSUBA Corporation, Gunma (JP)

( * ) Notice: Subject to any disclaimer, the term of this patent is extended or adjusted under 35 U.S.C. 154(b) by 291 days.

(21) Appl. No.: 16/644,167

(22) PCT Filed: Jan. 5, 2018

(86) PCT No.: PCT/JP2018/000064
§ 371 (c)(1),
(2) Date: Mar. 4, 2020

(87) PCT Pub. No.: WO2019/135278
PCT Pub. Date: Jul. 11, 2019

(65) Prior Publication Data
US 2021/0066993 A1    Mar. 4, 2021

(51) Int. Cl.
| H02K 15/00 | (2006.01) |
| H02K 5/22 | (2006.01) |
| H02K 7/116 | (2006.01) |
| H01R 12/58 | (2011.01) |

(52) U.S. Cl.
CPC .......... *H02K 5/225* (2013.01); *H02K 7/1166* (2013.01); *H02K 15/0062* (2013.01); *H01R 12/58* (2013.01)

(58) Field of Classification Search
CPC .. H02K 7/1166; H02K 5/225; H02K 15/0062; H02K 11/38
See application file for complete search history.

(56) References Cited

U.S. PATENT DOCUMENTS

| RE47,564 E | * | 8/2019 | Ozaki | .................. H02K 11/215 |
| 2007/0278873 A1 | * | 12/2007 | Macaire | ................. H02K 5/225 |
| | | | | 310/71 |
| 2012/0139371 A1 | * | 6/2012 | Gottschalk | ............. H02K 11/38 |
| | | | | 310/71 |

FOREIGN PATENT DOCUMENTS

| CN | 1933998 | 3/2007 |
| CN | 104124562 | 10/2014 |
| CN | 104488175 | 4/2015 |
| DE | 10229606 | 1/2004 |
| DE | 102013207578 | 10/2014 |

(Continued)

OTHER PUBLICATIONS

"International Search Report (Form PCT/ISA/210) of PCT/JP2018/000064," dated Apr. 3, 2018, with English translation thereof, pp. 1-4.

(Continued)

*Primary Examiner* — Leda T Pham
(74) *Attorney, Agent, or Firm* — JCIPRNET

(57) ABSTRACT

A motor device and a method for producing same are provided. A connector storage unit (33*d*) and a substrate storage unit (33*c*) which are provided in a gear case (31) open in a direction (axial direction of output shaft) which intersects the axial direction of an armature shaft. As a result, when assembling a motor device (10), it is possible to store a connector member (60) and a control substrate (50) in the connector storage unit (33*d*) and the substrate storage unit (33*c*), which have comparatively large openings, by insertion therein from the same direction.

3 Claims, 23 Drawing Sheets

(56) References Cited

FOREIGN PATENT DOCUMENTS

| JP | 2001128407 | 5/2001 |
|----|------------|--------|
| JP | 2007006593 | 1/2007 |
| JP | 2013243903 | 12/2013 |
| WO | 2014016093 | 1/2014 |

OTHER PUBLICATIONS

"Search Report of Europe Counterpart Application", dated Jul. 7, 2021, pp. 1-10.
Office Action of Japan Counterpart Application, with English translation thereof, dated Apr. 6, 2021, pp. 1-8.
Office Action of China Counterpart Application, with English translation thereof, dated Aug. 2, 2021, pp. 1-14.

* cited by examiner (a)

(b)

METHOD FOR PRODUCING MOTOR DEVICE

CROSS-REFERENCE TO RELATED APPLICATION

This application is a 371 application of the international PCT application serial no. PCT/JP2018/000064, filed on Jan. 5, 2018. The entirety of the above-mentioned patent applications is hereby incorporated by reference herein and made a part of this specification.

BACKGROUND OF THE INVENTION

Technical Field

The present invention relates to a motor device provided with a deceleration mechanism configured to decelerate rotation of a rotation shaft and a method for producing the same.

Background Art

In the related art, a motor device with a deceleration mechanism that is small but can obtain a large output has been used as a drive source for a power window device or the like mounted in a vehicle such as a car. Also, the motor device is rotated forward and backward by operating an operation switch and the like in an interior of the vehicle, and an opening/closing member such as a window glass is thus opened and closed.

For a motor device used as a drive source for a power window device or the like, the technology disclosed in Patent Literature 1 is known, for example. Since the motor device disclosed in Patent Literature 1 is placed in a space with a narrow width inside a door of a vehicle, a thickness dimension in a direction that intersects an axial direction of a rotation shaft is set to be thin, and the motor device is formed into a flat shape.

Also, the motor device disclosed in Patent Literature 1 includes a motor unit, a gear housing, and a connector module, and a control circuit substrate and a pair of connector terminals (for brush power supply) are provided in the connector module.

CITATION LIST

Patent Literature

[Patent Literature 1]
Japanese Patent Laid-Open No. 2013-243903

SUMMARY

Technical Problem

However, the motor device disclosed in Patent Literature 1 described above has a structure in which the connector module is inserted from a side surface of the gear housing with a narrow width at the time of assembling the motor device. Also, the pair of connector terminals are electrically connected to a power supply terminal inside the gear housing. Therefore, it is not possible to visually observe an electrically connected portion between the connector terminals and the power supply terminal from the outside, and this leads to degradation of assembly performance of the motor device.

An objective of the invention is to provide a motor device that enables easy and definitive assembly of the motor device and visual observation of the state of assembly thereof from the outside and a method for producing the same.

Solution to Problem

According to the invention, there is provided a motor device that includes a deceleration mechanism configured to decelerate rotation of a rotation shaft, the motor device including: a housing configured to store the deceleration mechanism and configured such that a height dimension along a direction that intersects an axial direction of the rotation shaft is smaller than a width dimension along the axial direction of the rotation shaft; a connector storage unit provided in the housing and configured to store a connector member to which an external connector is connected; and a substrate storage unit provided in the housing and configured to store a control substrate configured to control rotation of the rotation shaft, in which the connector storage unit and the substrate storage unit are opened in the direction that intersects the axial direction of the rotation shaft.

According to another aspect of the invention, the housing is provided with a motor-side conductive member, and the connector member is provided with a connector-side conductive member, and a first terminal of the motor-side conductive member is connected to the control substrate, and a second terminal of the connector-side conductive member is connected to the control substrate, and the first terminal and the second terminal extend in the direction that intersects the axial direction of the rotation axis.

According to another aspect of the invention, the first terminal and the second terminal are inserted with elastic deformation into through-holes of the control substrate.

According to the invention, there is provided a method for producing a motor device that includes a deceleration mechanism configured to decelerate rotation of a rotation shaft, in which the motor device includes a housing configured to store the deceleration mechanism and configured such that a height dimension along a direction that intersects an axial direction of the rotation shaft is smaller than a width dimension along the axial direction of the rotation shaft, a connector storage unit provided in the housing and configured to store a connector member to which an external connector is connected, and a substrate storage unit provided in the housing and configured to store a control substrate configured to control rotation of the rotation shaft, the connector storage unit and the substrate storage unit are opened in the direction that intersects the axial direction of the rotation shaft, the housing is provided with a motor-side conductive member, and a connector member is provided with a connector-side conductive member, and a first terminal of the motor-side conductive member is connected to the control substrate, and a second terminal of the connector-side conductive member is connected to the control substrate, and the first terminal and the second terminal extend in the direction that intersects the axial direction of the rotation shaft, the method including: a first process of positioning the connector member with respect to the connector storage unit; and a second process of inserting the first terminal and the second terminal into through-holes of the control substrate with elastic deformation and positioning the control substrate with respect to the substrate storage unit.

According to another aspect of the invention, a secured jig secured to a base and a movable jig configured to approach or separate from the secured jig are used in the first process and the second process, the secured jig is provided with a housing holding unit configured to hold the housing at a predetermined position, the movable jig is provided with a connector pin configured to position the connector member at a predetermined position with respect to the connector storage unit and a substrate pin configured to hold the control substrate at a predetermined position and configured to be shorter than the connector pin, the movable jig is caused to approach the secured jig and the connector pin is inserted into a connector hole provided in the connector member in the first process, and the movable jig is caused to further approach the secured jig and the substrate pin is inserted into a housing hole provided in the housing in the second process.

According to another aspect of the invention, the motor-side conductive member is incorporated in the housing through insert molding, and the connector-side conductive member is incorporated in the connector member through insert molding.

Advantageous Effects of Invention

According to the invention, the connector housing unit and the substrate storage unit provided in the housing are opened in the direction that intersects the axial direction of the rotation axis. In this manner, it is possible to store the connector member and the control substrate from directions that are the same as those of the connector storage unit and the substrate storage unit that have comparatively large openings when the motor device is assembled. Therefore, it is possible to visually observe the state of assembly of the motor device from the outside, and it is possible to easily and definitively assembly the motor device.

BRIEF DESCRIPTION OF THE DRAWINGS (a) and (b) of FIG. 1 are plan views of a motor device used as a drive source for a power window device.

Figure 12:
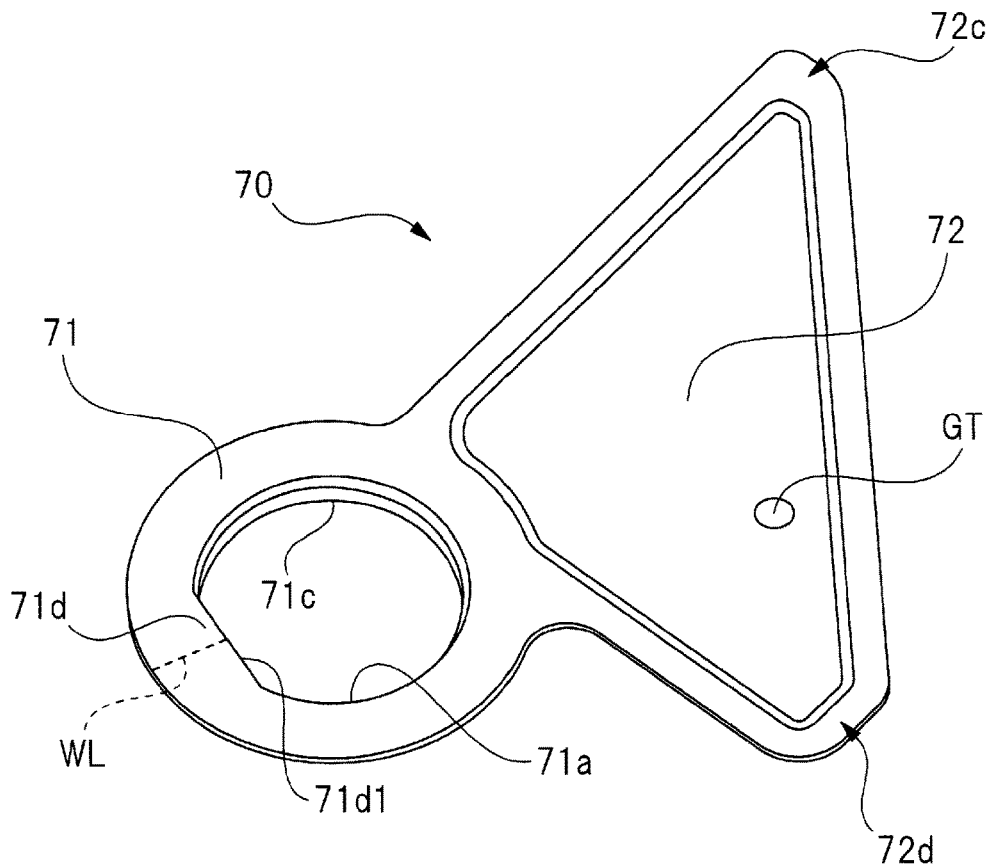
Figure 12:
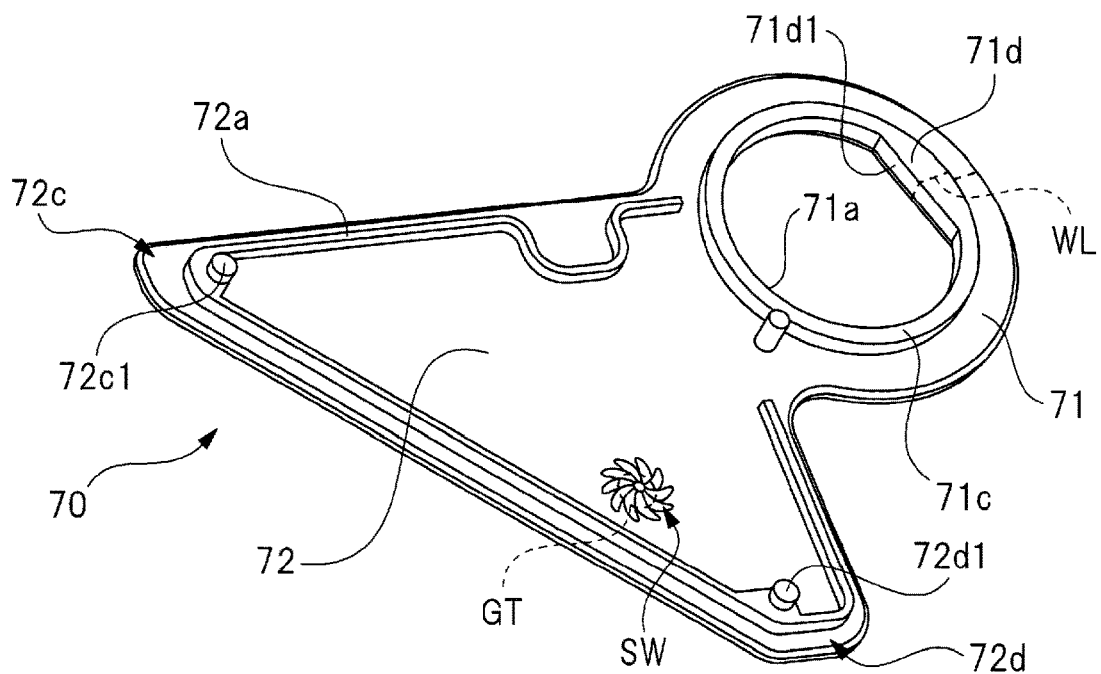

(a) and (b) of FIG. 12 are perspective views illustrating only the cover member.

Figure 13:
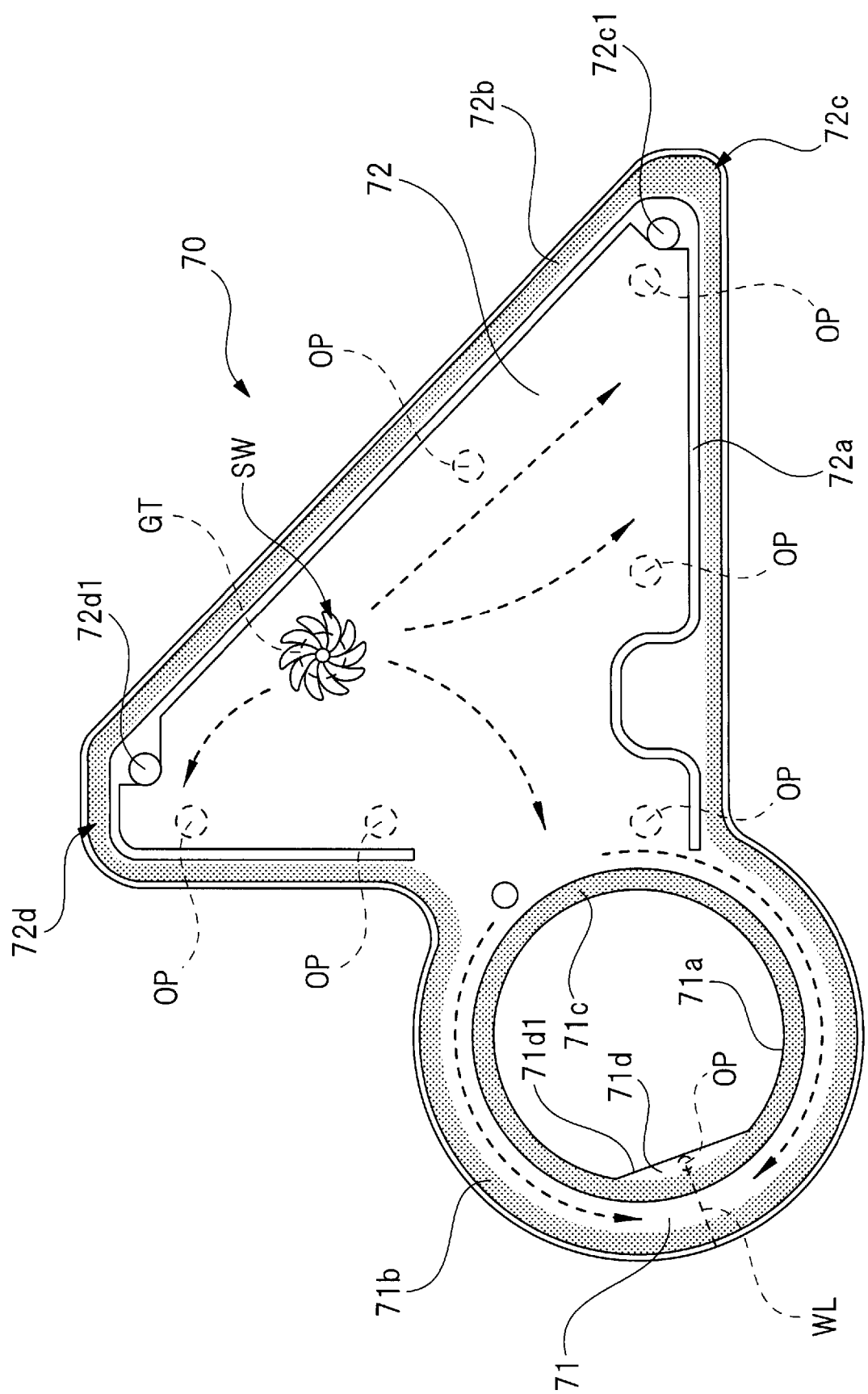

FIG. 13 is a plan view for explaining a flow of a resin when the cover member is molded.

Figure 14:
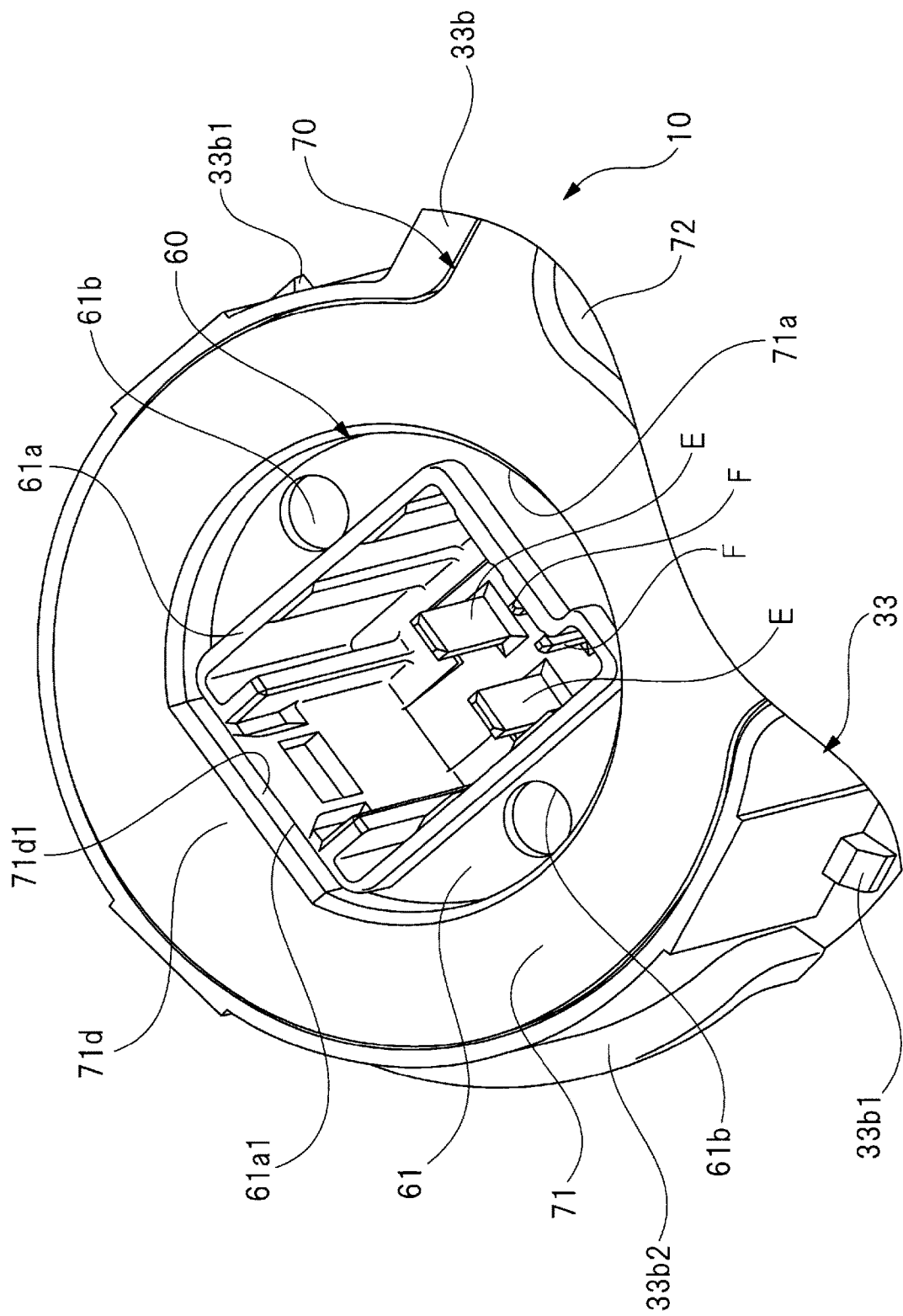

FIG. 14 is a perspective view illustrating a portion at which the cover member and the connector member abut on each other.

Figure 15:
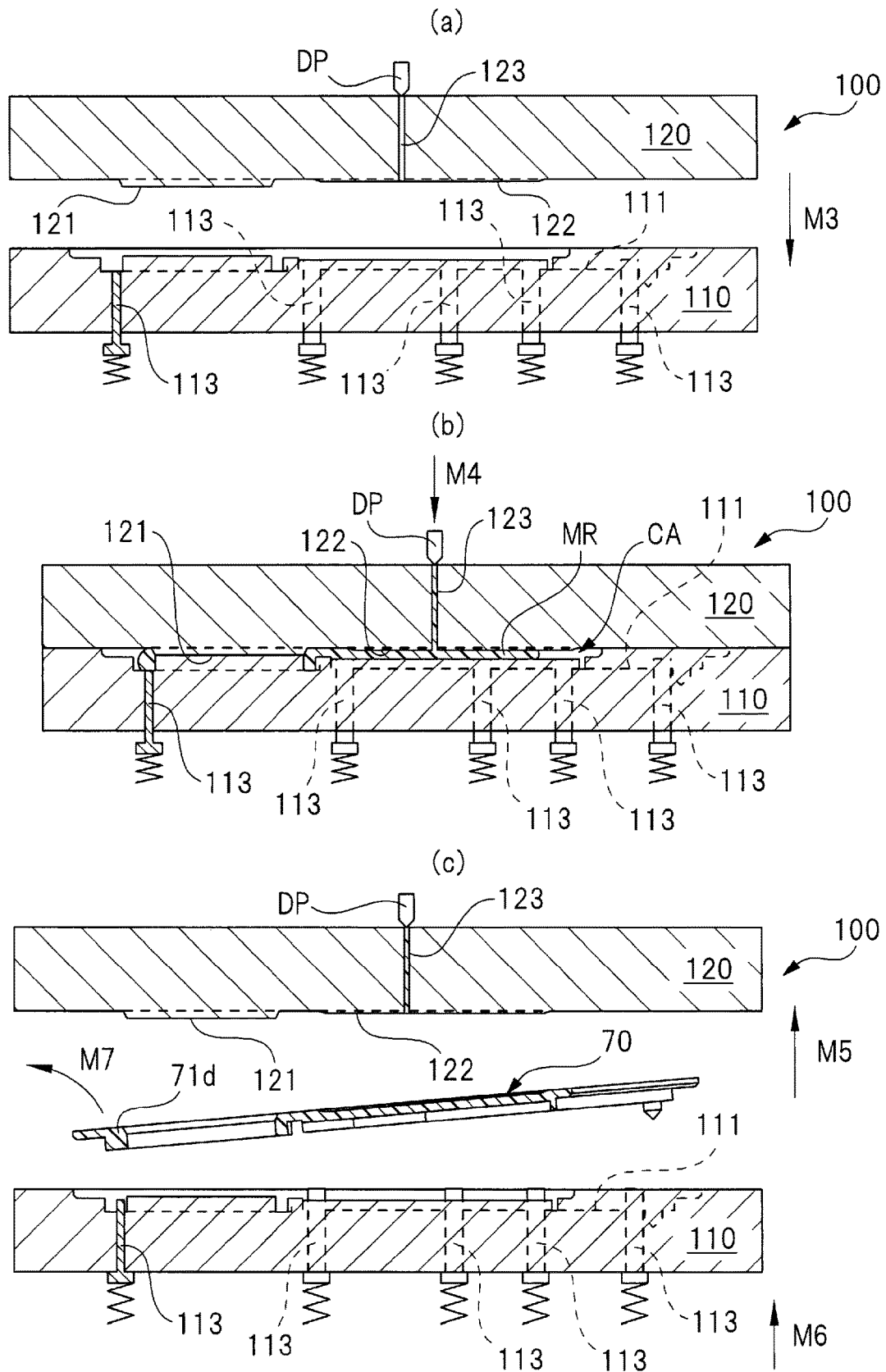

(a), (b), and (c) of FIG. 15 are explanatory diagrams for explaining a procedure for producing the cover member.

Figure 16:
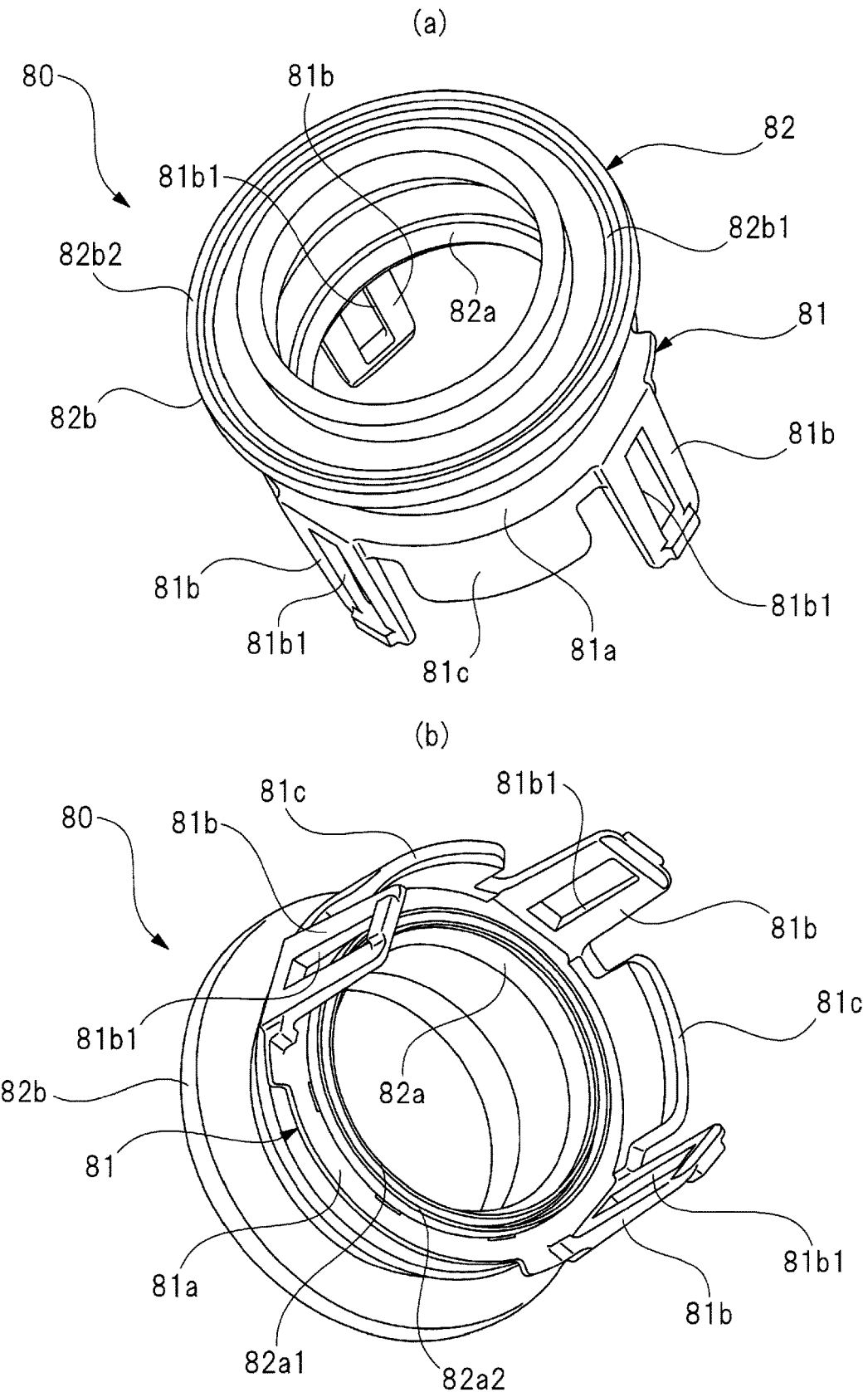

(a) and (b) of FIG. 16 are perspective view illustrating only a grommet member.

Figure 17:
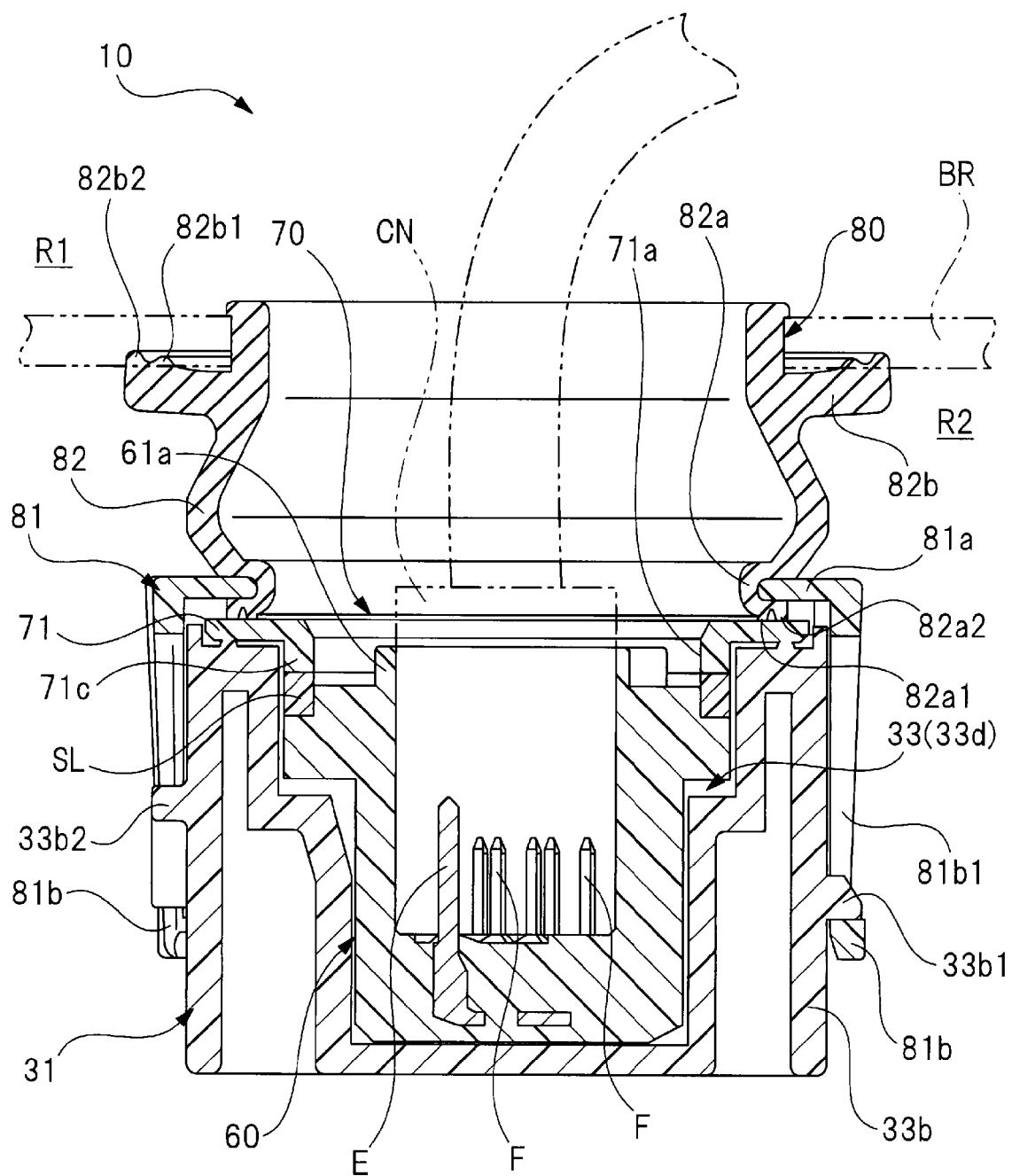

FIG. 17 is a sectional view illustrating the grommet member and the gear case.

Figure 18:
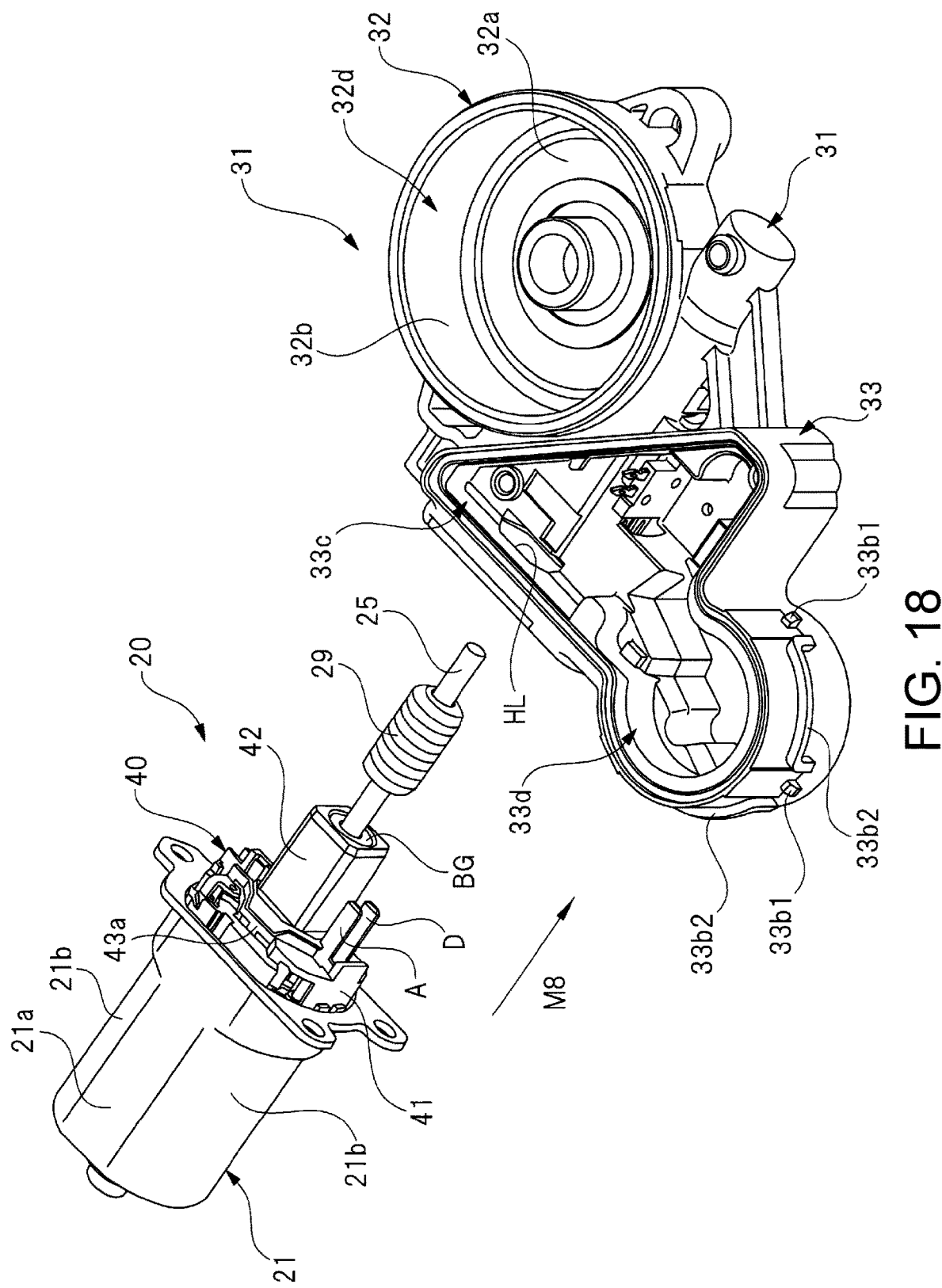

FIG. 18 is a perspective view for explaining a procedure for attaching the motor unit to the gear case.

Figure 19:
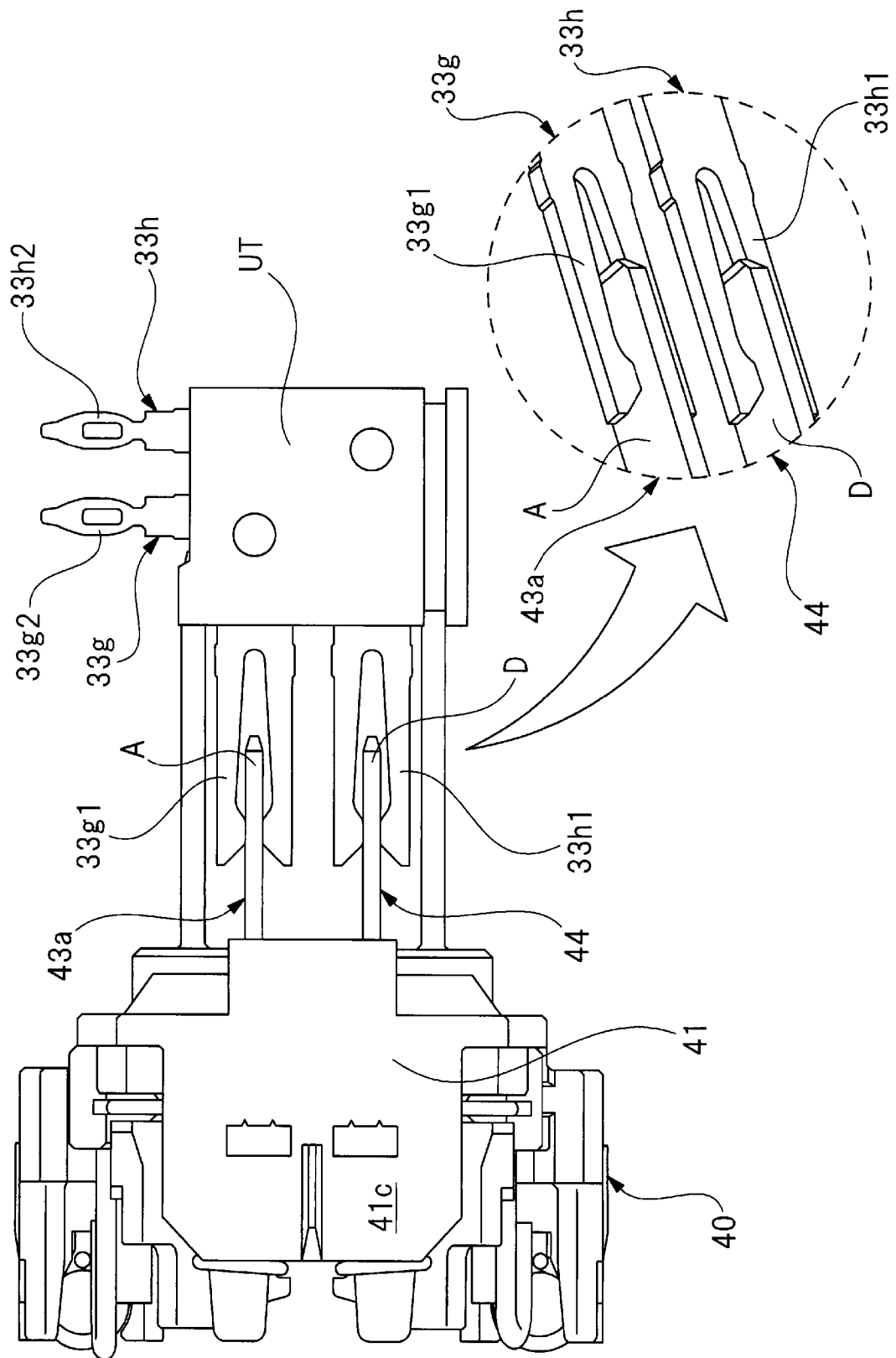

FIG. 19 is a perspective view for explaining a procedure for connecting the brush-side driving conductive member to a substrate-side driving conductive member.

Figure 20:
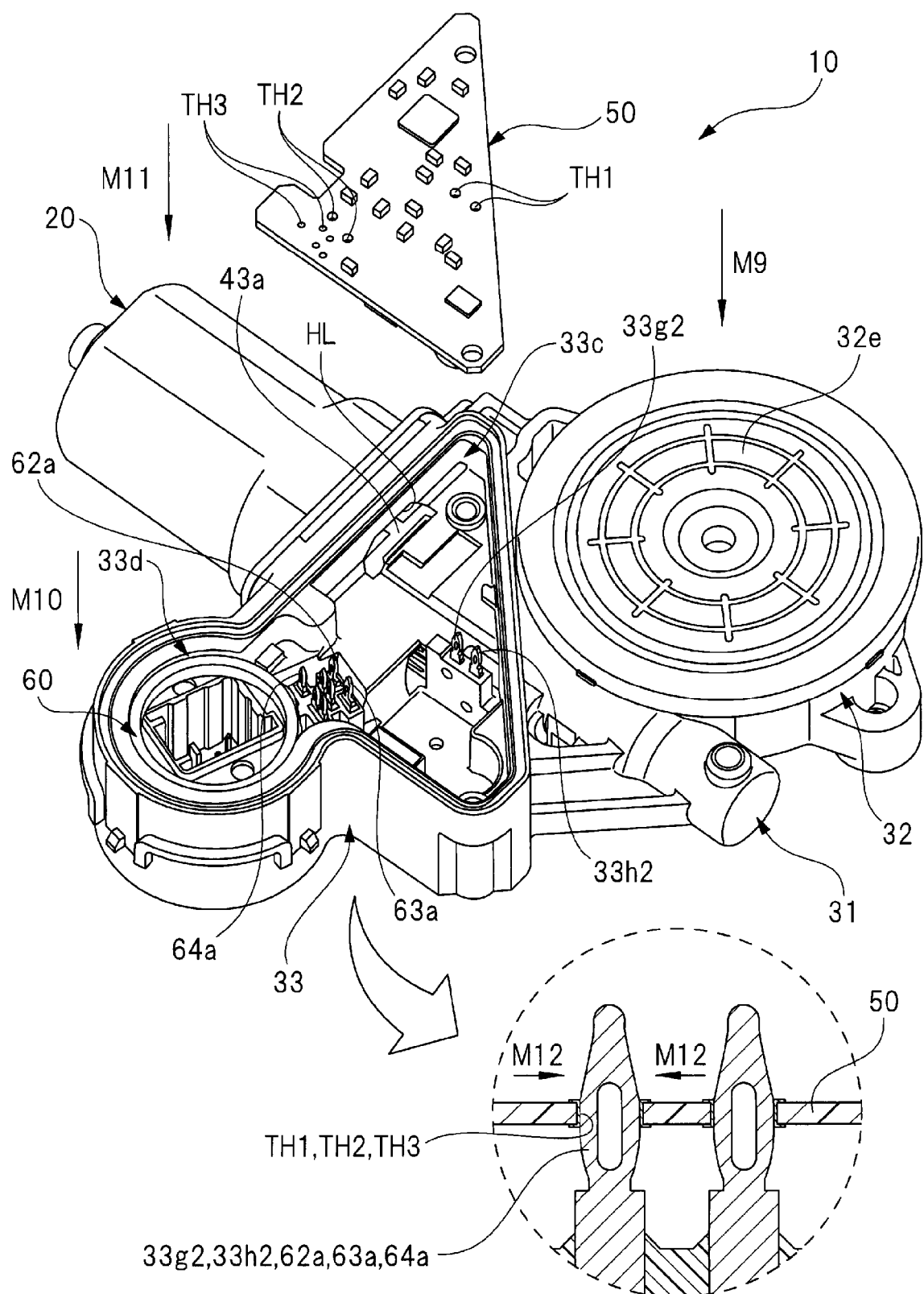

FIG. 20 is a perspective view for explaining a procedure for storing the connector member and the control substrate in the gear case.

Figure 21:
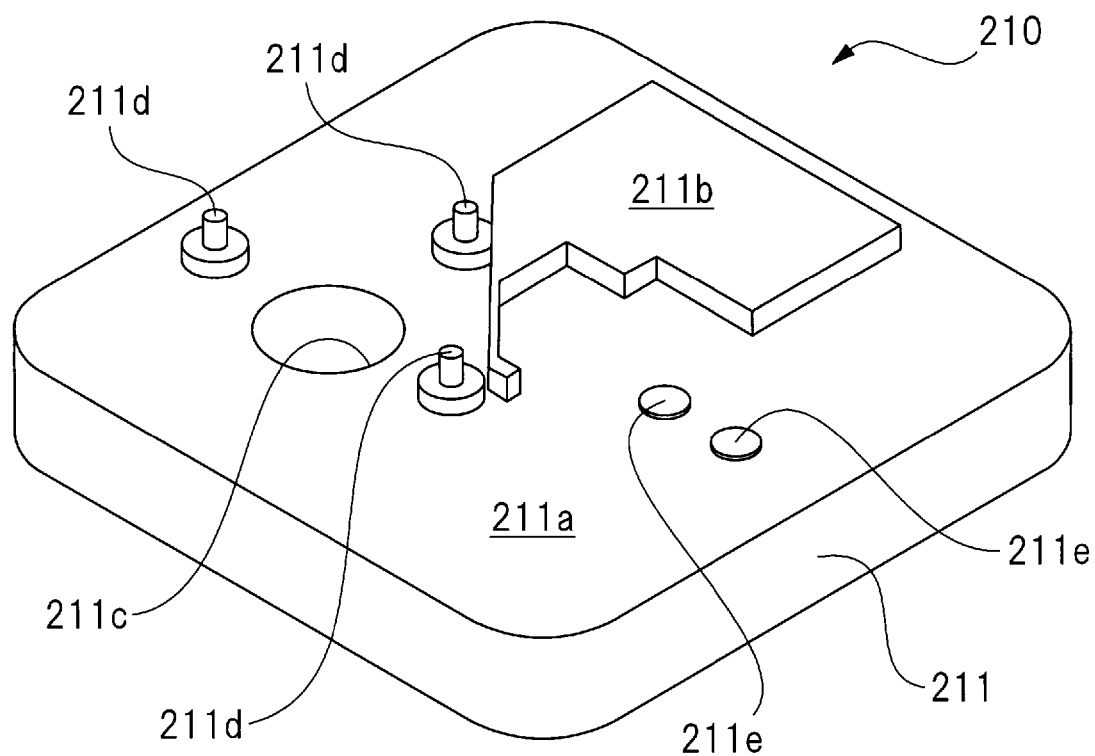

FIG. 21 is a perspective view illustrating a secured jig at which the gear case is set.

Figure 22:
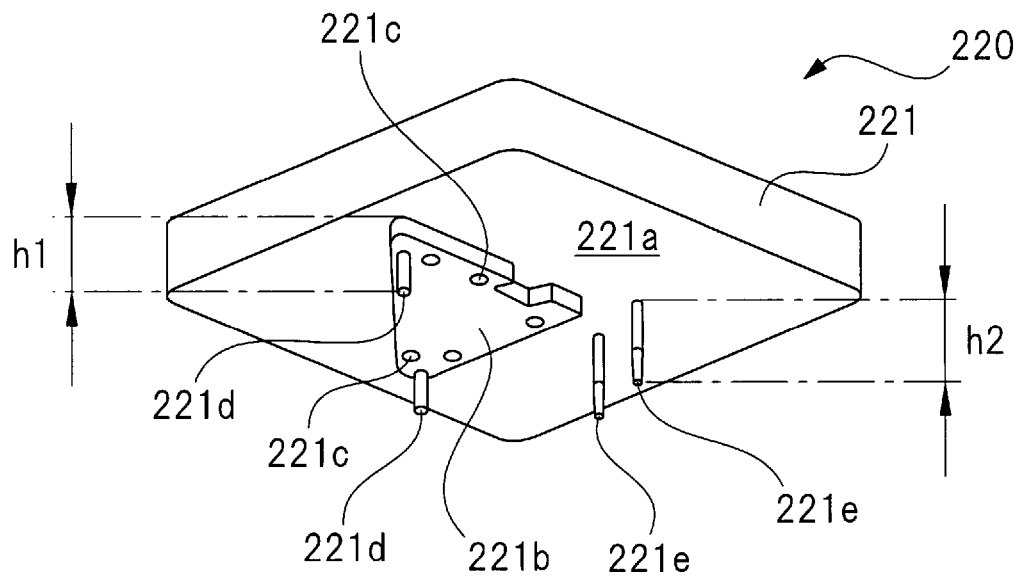

FIG. 22 is a perspective view illustrating a movable jig at which the control substrate is set.

Figure 23:
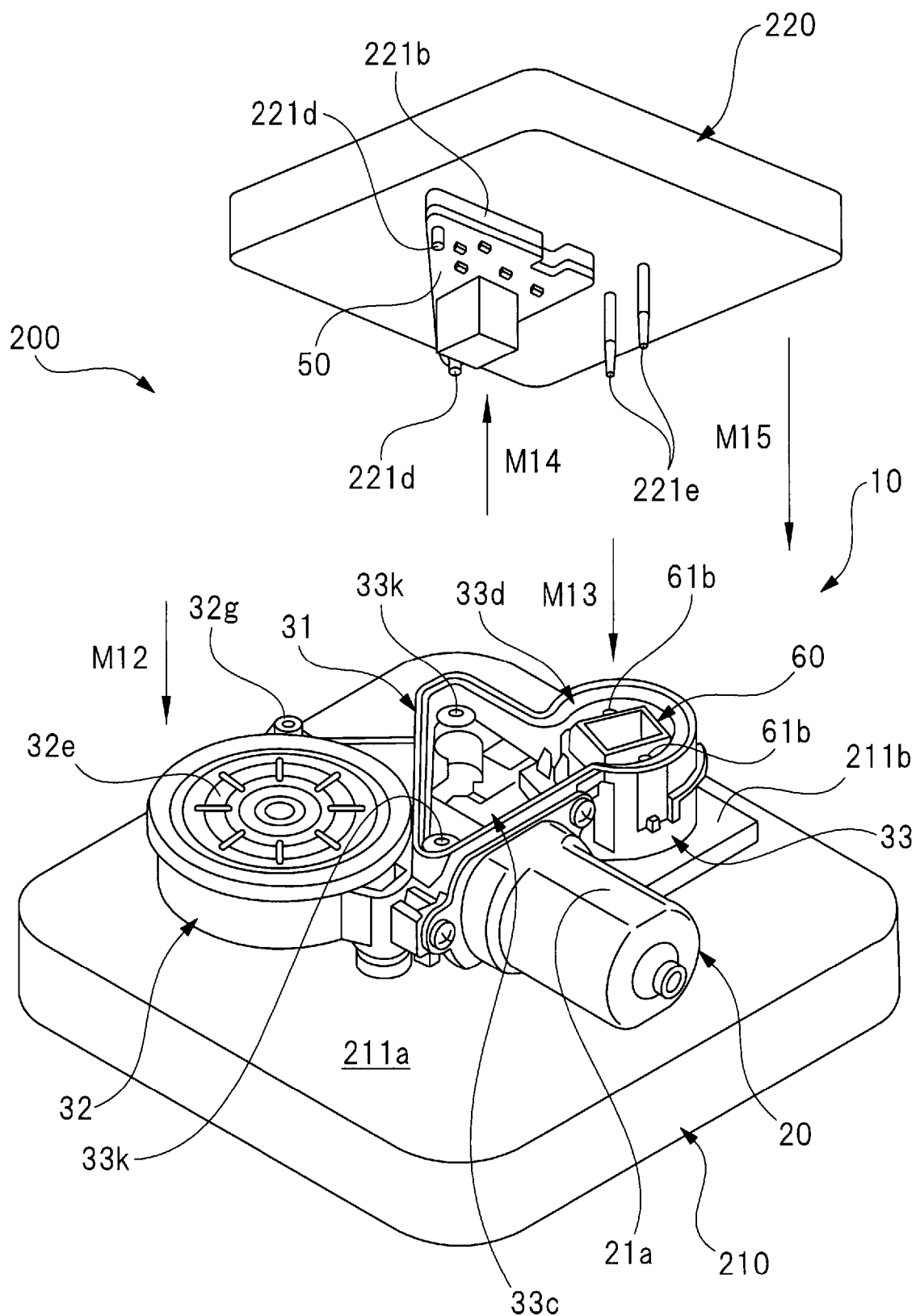

FIG. 23 is a perspective view for explaining operations of an automatic assembly device.

Figure 24:
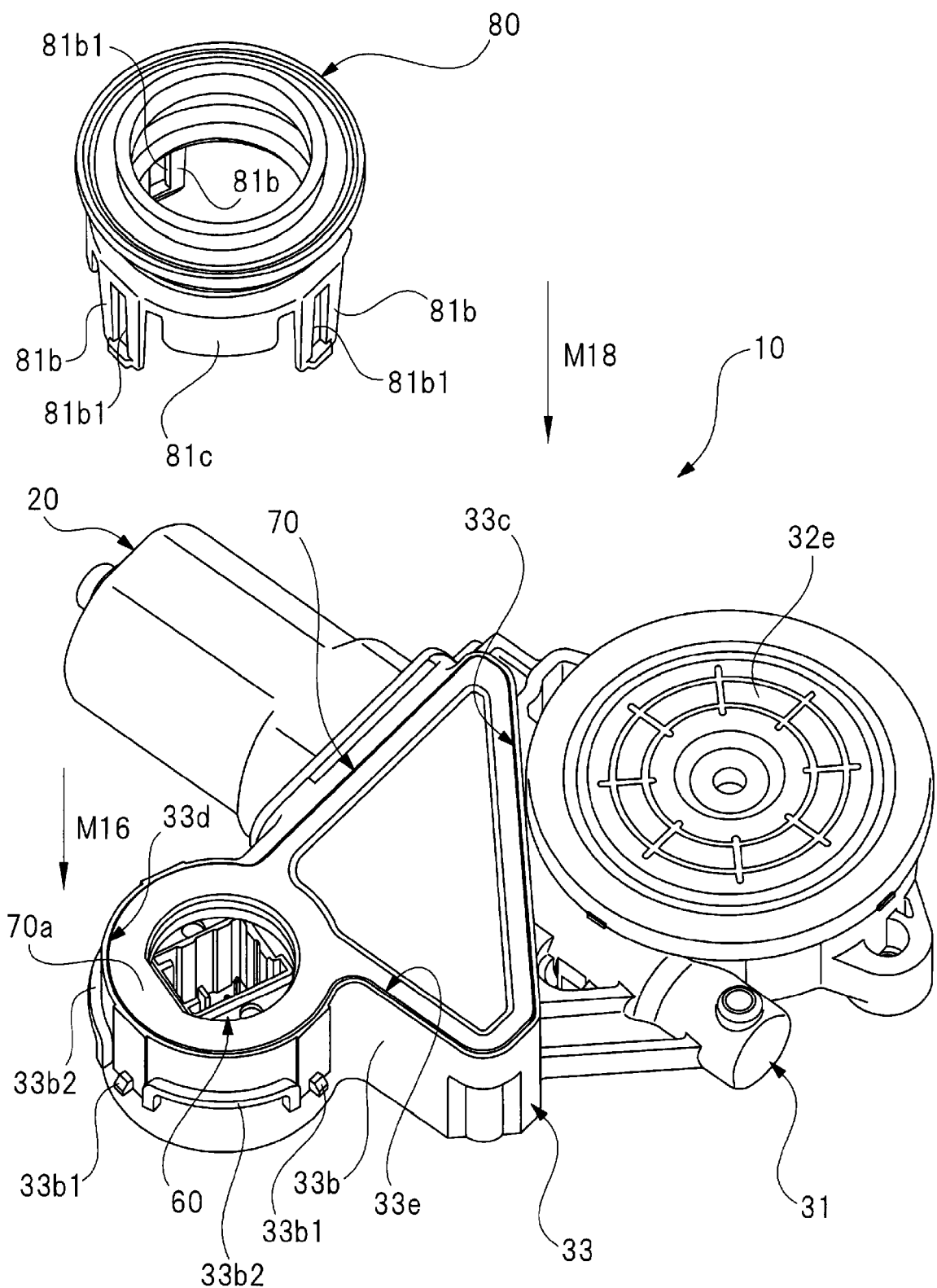

FIG. 24 is a sectional view for explaining operations of a laser welding device.

Figure 25:
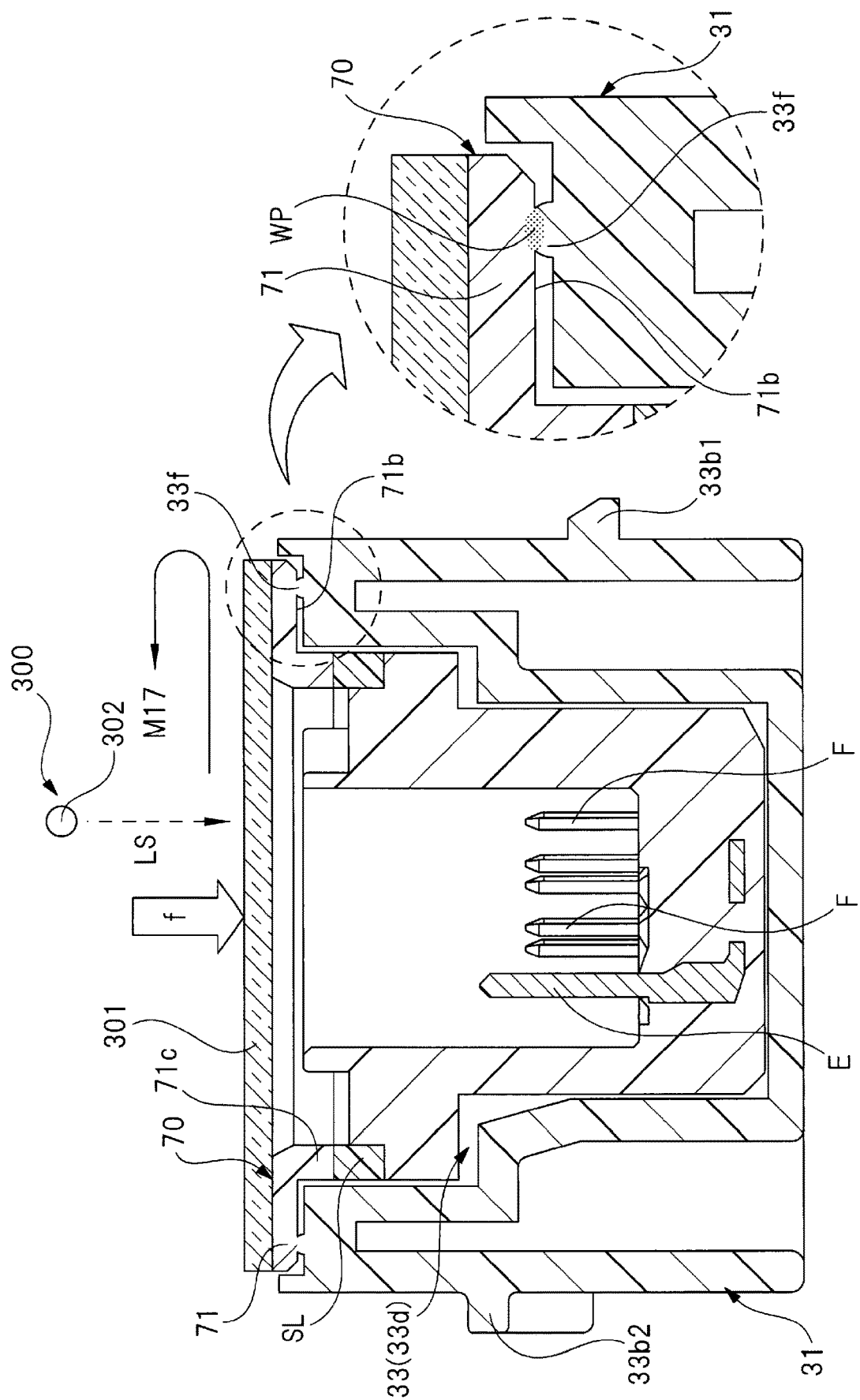

FIG. 25 is a perspective view for explaining a procedure for attaching the grommet member to the gear case.

DESCRIPTION OF THE EMBODIMENTS

Hereinafter, an embodiment of the invention will be described in detail with reference to drawings.

Figure 1:
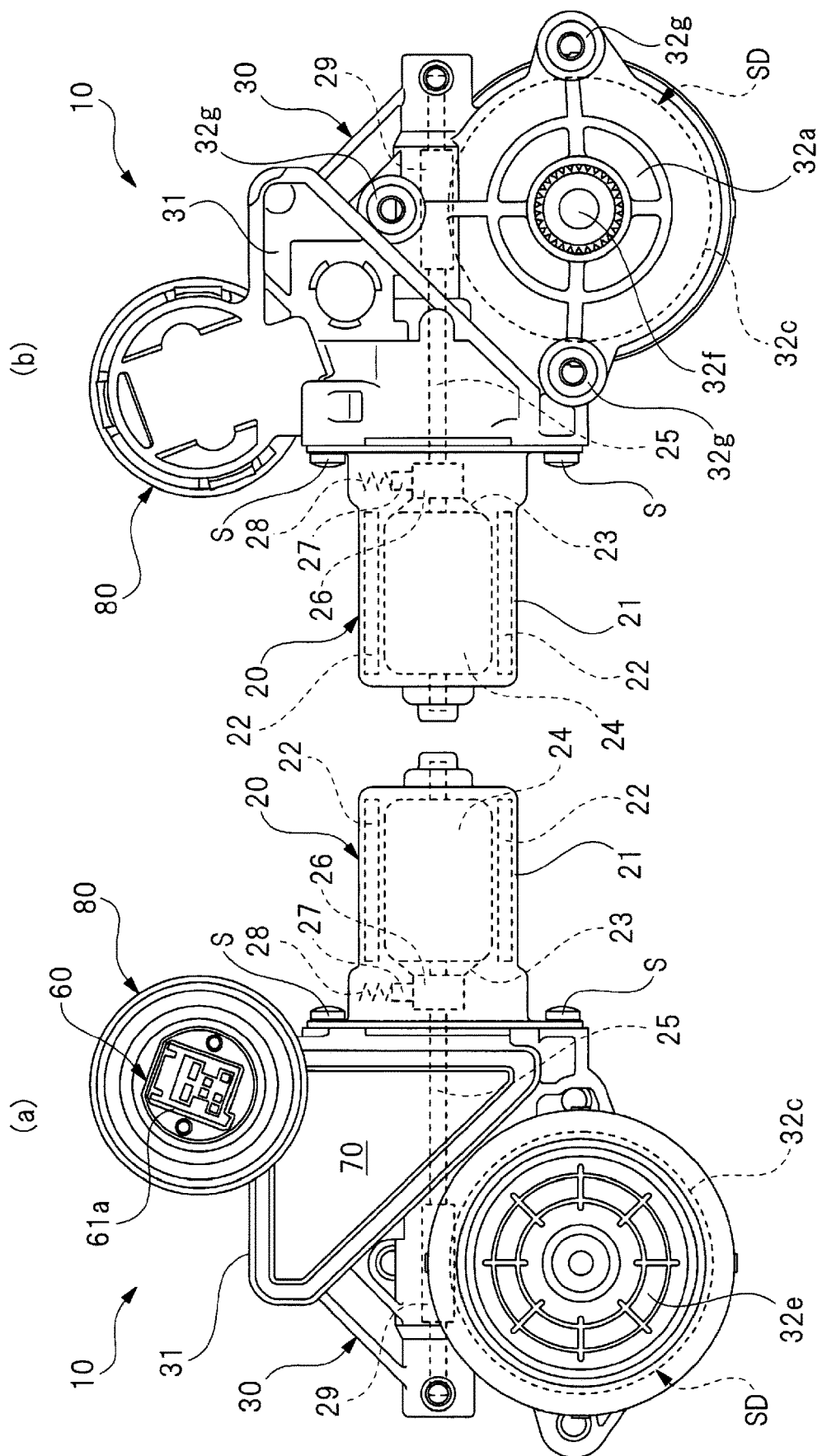
Figure 2:
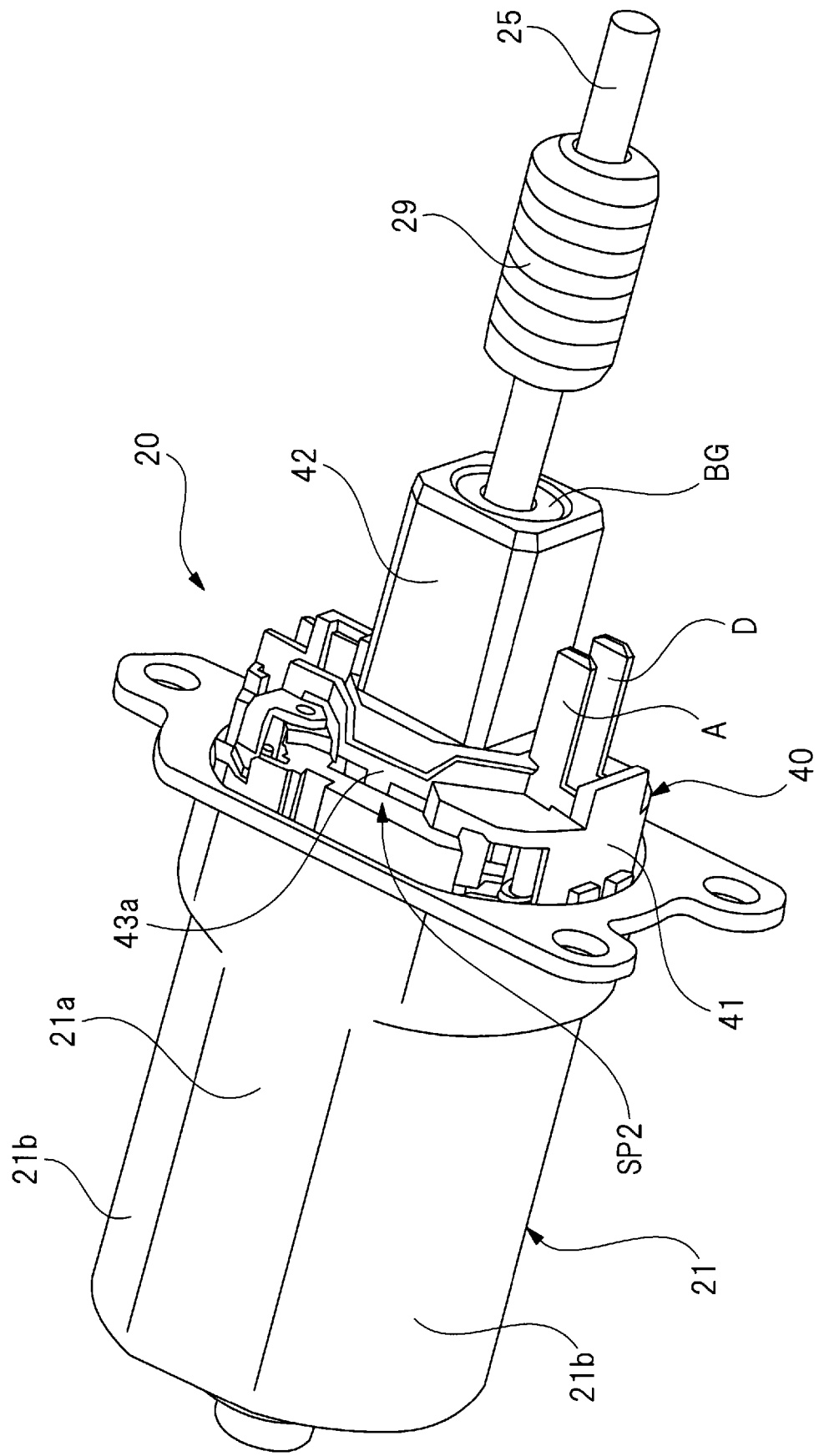
FIG. 2 is a perspective view illustrating only a motor unit.

(a) and (b) of FIG. 1 are plan views of a motor device used as a drive source for a power window device, and FIG. 2 is a perspective view illustrating only a motor unit.

A motor device 10 illustrated in FIGS. 1 and 2 is used as a drive source for a power window device (not illustrated) mounted in a vehicle such as a car and is configured to drive a window regulator (not illustrated) configured to lift and lower a window glass. The motor device 10 is a motor with a deceleration mechanism that allows for a large output regardless of the small size thereof and is placed in a space (not illustrated) with a narrow width formed in a door of the vehicle. The motor device 10 includes a motor unit 20 and a gear unit 30, and the motor unit 20 and the gear unit 30 are coupled to each other with a total of three fastening screws S (only two of them are illustrated in the drawing) as a unit.

As illustrated in FIG. 2, the motor unit 20 includes a motor case 21 formed into a bottomed tubular shape obtained by performing press-working or the like on a steel plate made of a magnetic material. The motor case 21 includes planar walls 21a (only one of them is illustrated in the drawing) that face each other, and arc walls 21b that face each other, and the sectional shape thereof is formed into substantially an oval shape. In other words, the thickness dimension of the motor case 21 in the direction in which the pair of planar walls 21a face each other is thin to form the motor unit 20 into a flat shape such that the motor device 10 can be placed in the space with a narrow width in the door.

Figure 9:
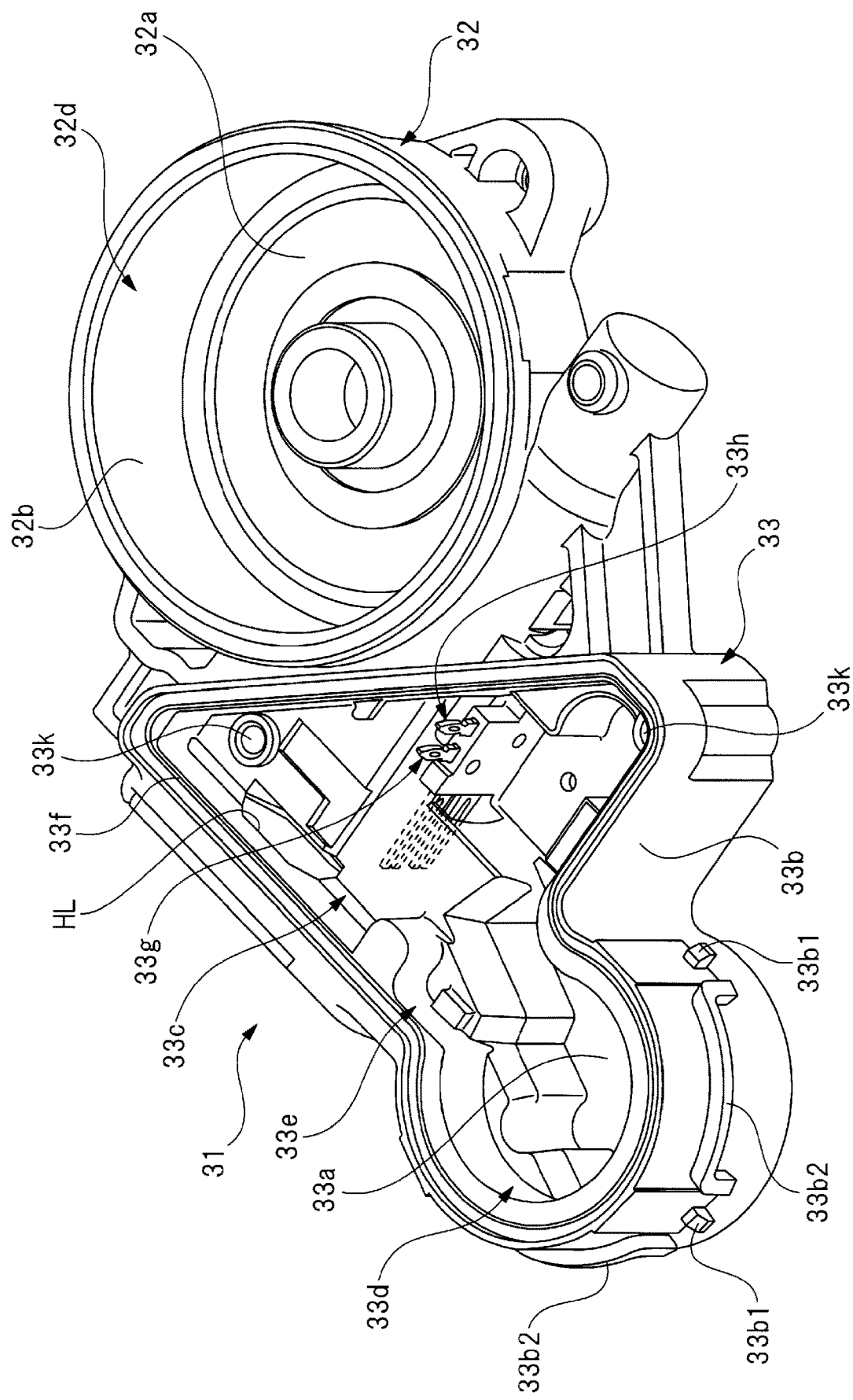
FIG. 9 is a perspective view illustrating only the gear case.

Here, the gear case 31 has also a flat shape in accordance with the flat shape of the motor case 21 (see FIG. 9). Specifically, the height dimension of the gear case 31 along a direction that intersects an axial direction of an armature shaft 25 is smaller than the width direction thereof along the axial direction of the armature shaft 25.

Also, (a) of FIG. 1 illustrates a plan view of the motor device 10 on the side of a connector member 60 (front side). In addition, (b) of FIG. 1 illustrates a plan view of the motor device 10 on the side of an output shaft 32f (rear side).

A total of four magnets 22 (only two of them are illustrated in the drawing) with sectional surfaces formed into substantially an arc shape are secured to an inner wall of the motor case 21, and armatures 24 around with coils 23 are wound are rotatably stored inside the magnets 22 with predetermined gaps. In addition, a brush holder 40 as illustrated in FIG. 2 is attached on an opening side of the motor case 21, and the brush holder 40 blocks the opening side of the motor case 21.

The armature shaft (rotation shaft) 25 is secured to a rotation center of the armature 24. The armature shaft 25 is provided across both the motor unit 20 and the gear unit 30, one side of the armature shaft 25 in the axial direction (the left side in FIG. 2) is stored in the motor case 21, and the other side of the armature shaft 25 in the axial direction (the right side in FIG. 2) is stored in the gear case 31.

A commutator 26 formed into substantially a tubular shape is secured at substantially an intermediate portion of the armature shaft 25 along the axial direction, which is a portion that is close to the armature 24. Ends of the coils 23 wound around the armatures 24 are electrically connected to the commutator 26.

A pair of brushes 27 held by the brush holder 40 are in sliding contact with an outer periphery of the commutator 26. The brushes 27 are in elastic contact with the commutator 26 with a biasing force of a spring member 28. In this manner, a rotation force (electromagnetic force) is generated in the armatures 24 by a drive current being supplied from an in-vehicle controller (not illustrated) to the brushes 27, and the armature shaft 25 is thus rotated at a predetermined frequency with a rotation torque.

A worm gear 29 is provided on the other side of the armature shaft 25 in the axial direction. The worm gear 29 is formed into substantially a tubular shape and is secured to the armature shaft 25 through pressure-fitting. The worm gear 29 is engaged with a tooth unit (not illustrated) of a worm wheel 32c rotatably stored in the gear case 31. In this manner, the worm gear 29 is rotated in the gear case 31 due to rotation of the armature shaft 25, and the rotation is transmitted to the worm wheel 32c. Here, the worm gear 29 and the worm wheel 32c form a deceleration mechanism SD, and the deceleration mechanism SD decelerates the rotation of the armature shaft 25 to obtain a high torque.

Here, the one side of the armature shaft 25 in the axial direction is rotatably held by a bearing member (not illustrated) provided in the motor case 21, and the other side of the armature shaft 25 in the axial direction is rotatably held by a bearing member (not illustrated) provided in the gear case 31. Further, the substantially intermediate portion of the armature shaft 25 along the axial direction is rotatably held by a bearing member BG held by a bearing holding tube 42 of the brush holder 40 as illustrated in FIG. 2.

In this manner, the armature shaft 25 is rotatably held by a total of three bearing members. In this manner, deflection of the armature shaft 25 during rotation is curbed, and the armature shaft 25 can stably rotate at a high speed with substantially no shaking. Therefore, it is possible to effectively curb generation of noise and the like of the motor device 10.

Next, a structure of the brush holder 40 that blocks the opening side of the motor case 21 will be described in detail with reference to FIGS. 3 to 7.

Figure 3:
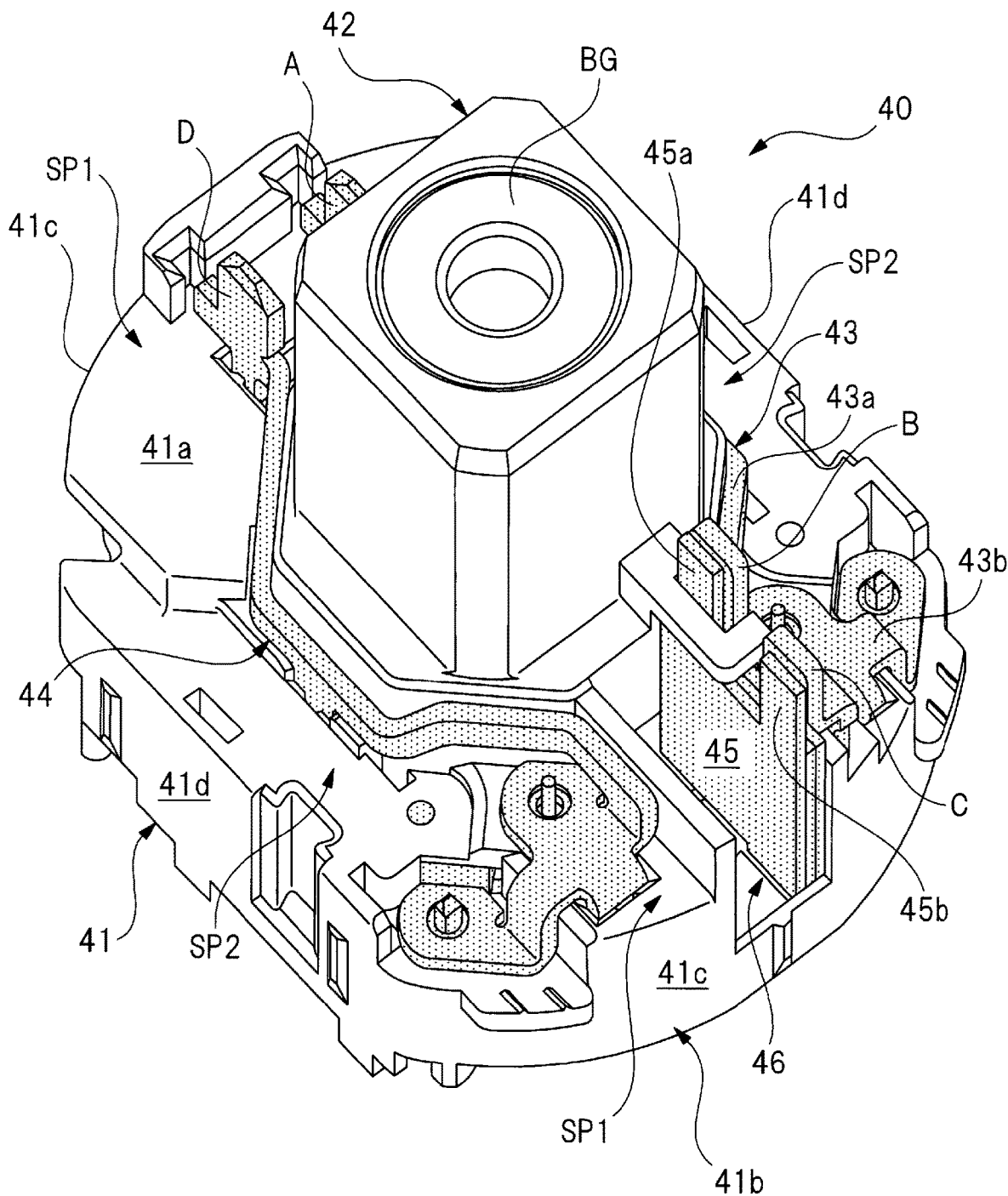
FIG. 3 is a perspective view of a brush holder when seen from a side of a gear case.
Figure 4:
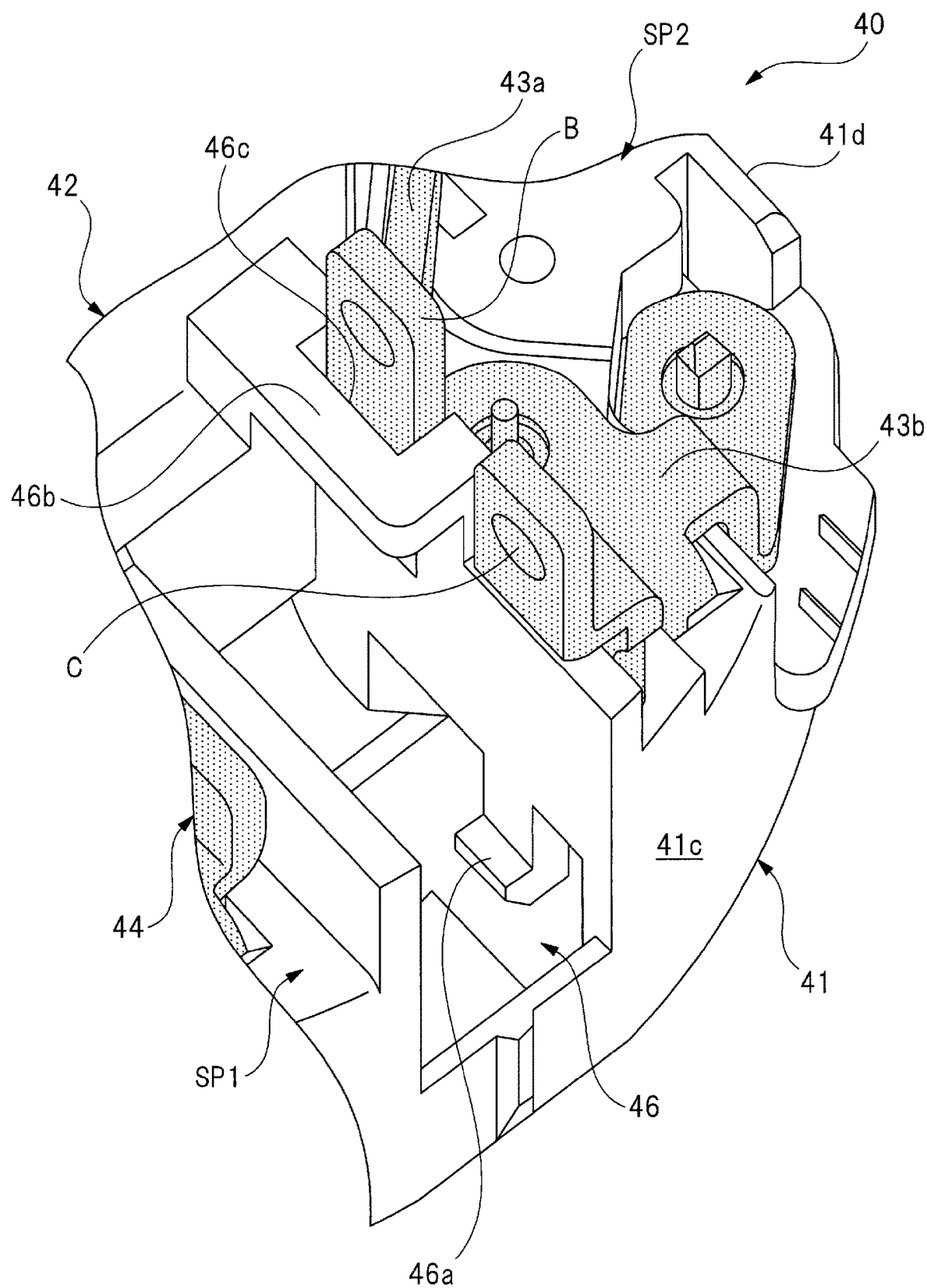
FIG. 4 is an enlarged perspective view of a PTC securing unit of the brush holder.
Figure 5:
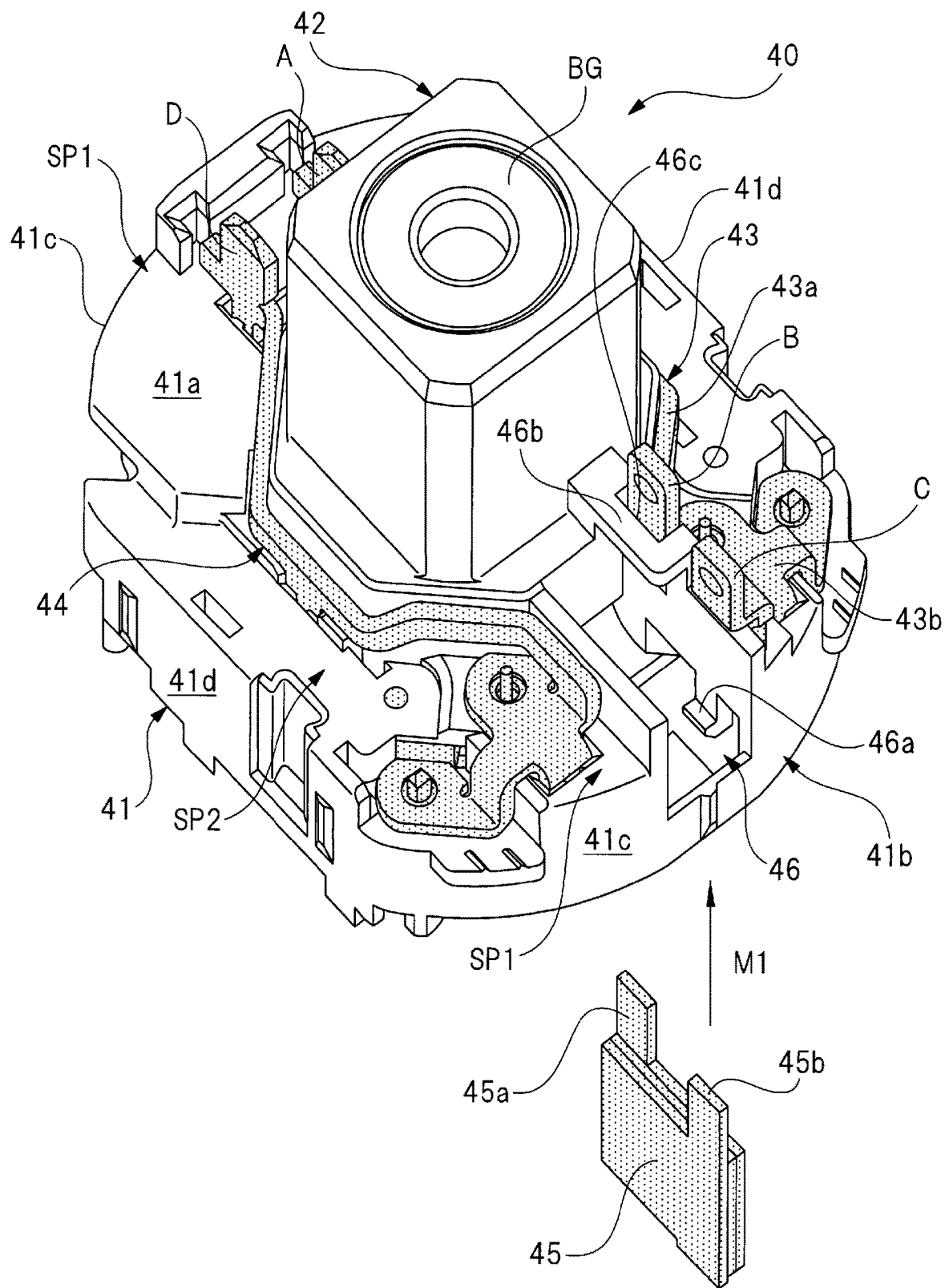
FIG. 5 is a perspective view for explaining a procedure for attaching a PTC.
Figure 6:
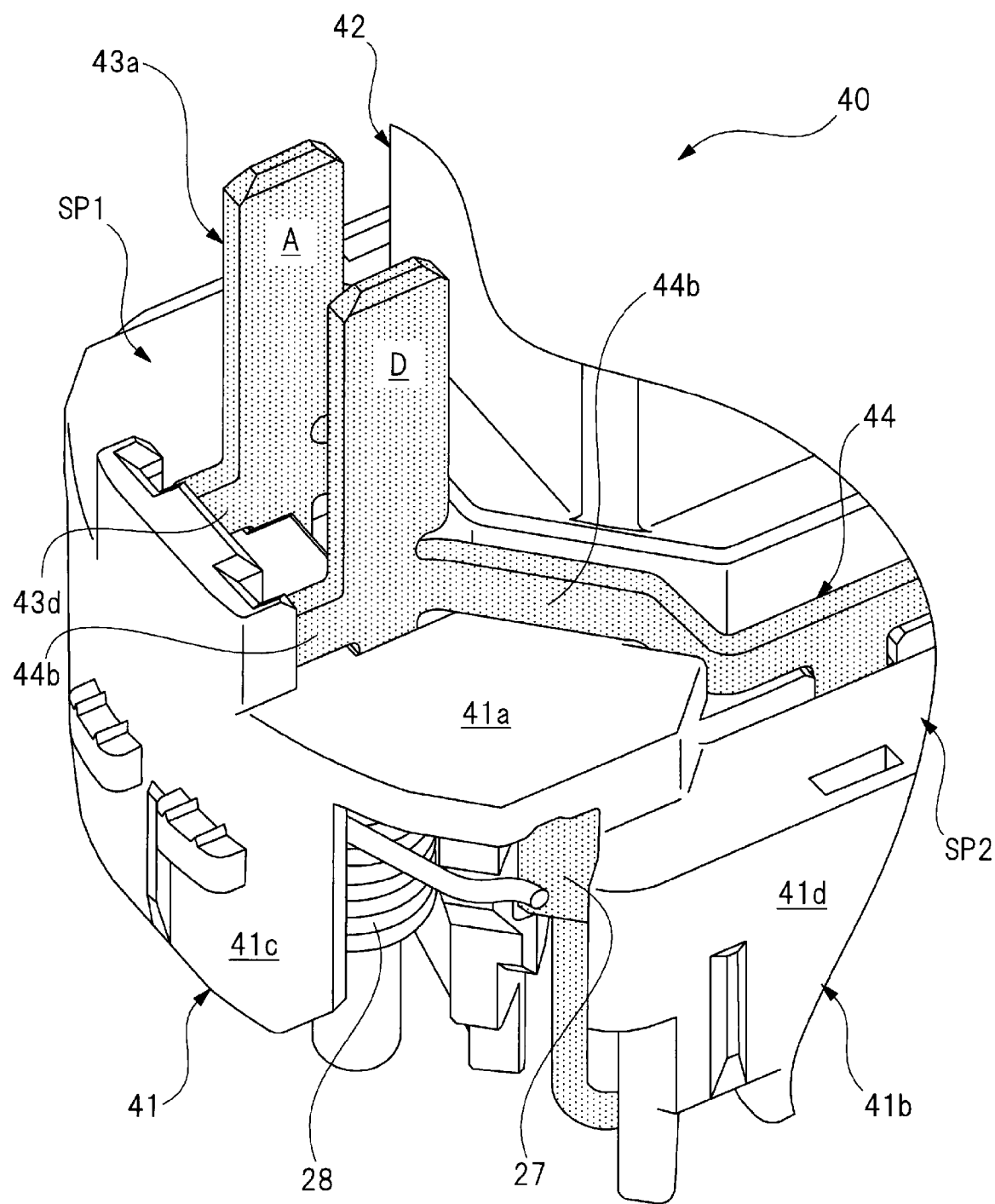
FIG. 6 is a perspective view of a periphery of a brush-side driving conductive member on one side in a longitudinal direction.
Figure 7:
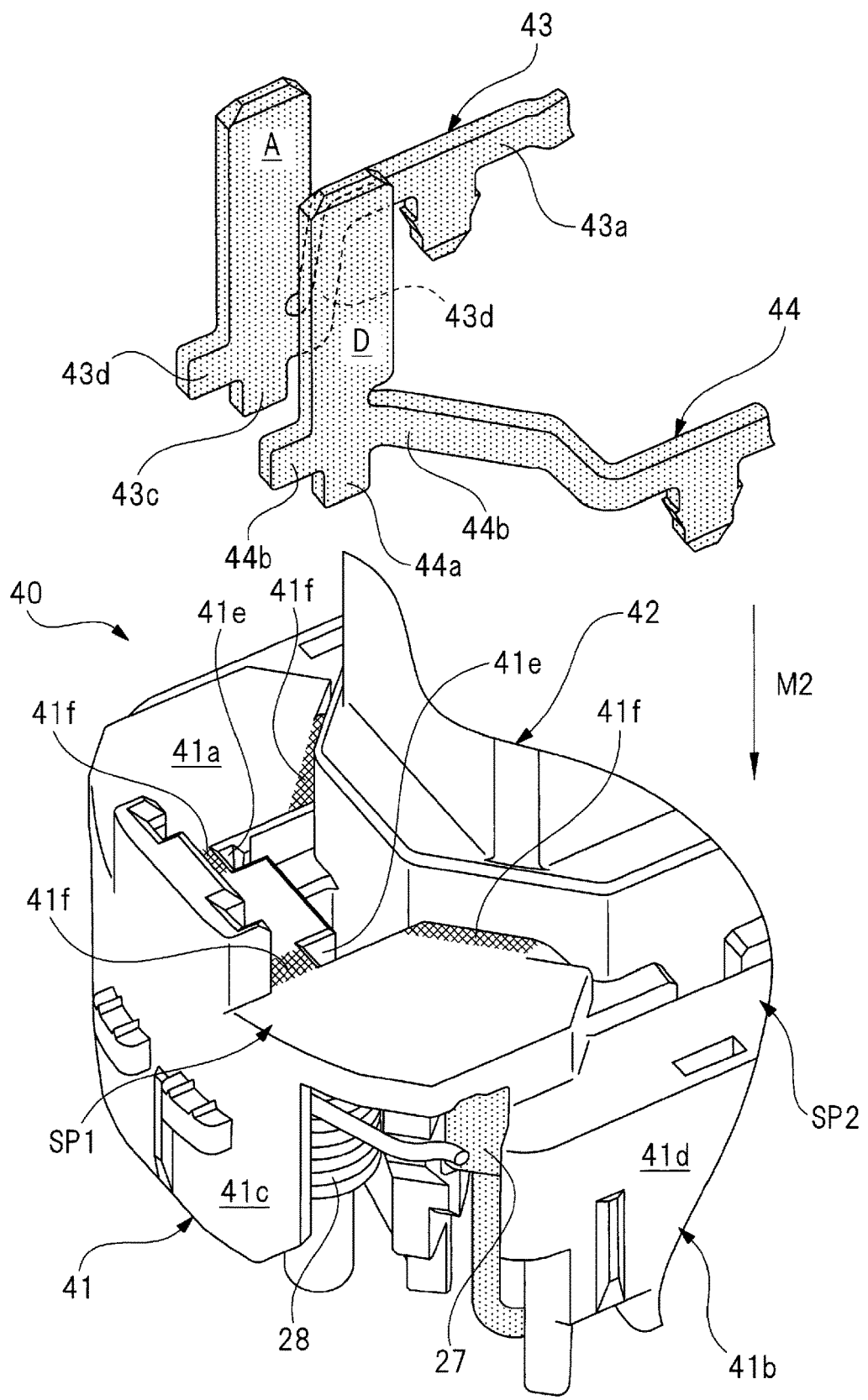
FIG. 7 is a perspective view for explaining a procedure for attaching the brush-side driving conductive member.

FIG. 3 is a perspective view of the brush holder when seen from the side of the gear case, FIG. 4 is an enlarged perspective view of a PTC securing unit of the brush holder, FIG. 5 is a perspective view for explaining a procedure for attaching a PTC, FIG. 6 is a perspective view of a periphery of a brush-side driving conductive member on one side in the longitudinal direction, and FIG. 7 is a perspective view for explaining a procedure for attaching the brush-side driving conductive member.

The brush holder 40 holding the pair of brushes 27 is accommodated in both the motor case 21 and the gear case 31. In other words, the brush holder 40 is disposed across both the motor case 21 and the gear case 31. The brush holder 40 is formed into a predetermined shape by injection molding a resin material such as plastic and includes a holder main body 41 and a bearing holding tube 42. Here, electronic components attached to the brush holder 40 are hatched in FIGS. 3 to 7.

Figure 10:
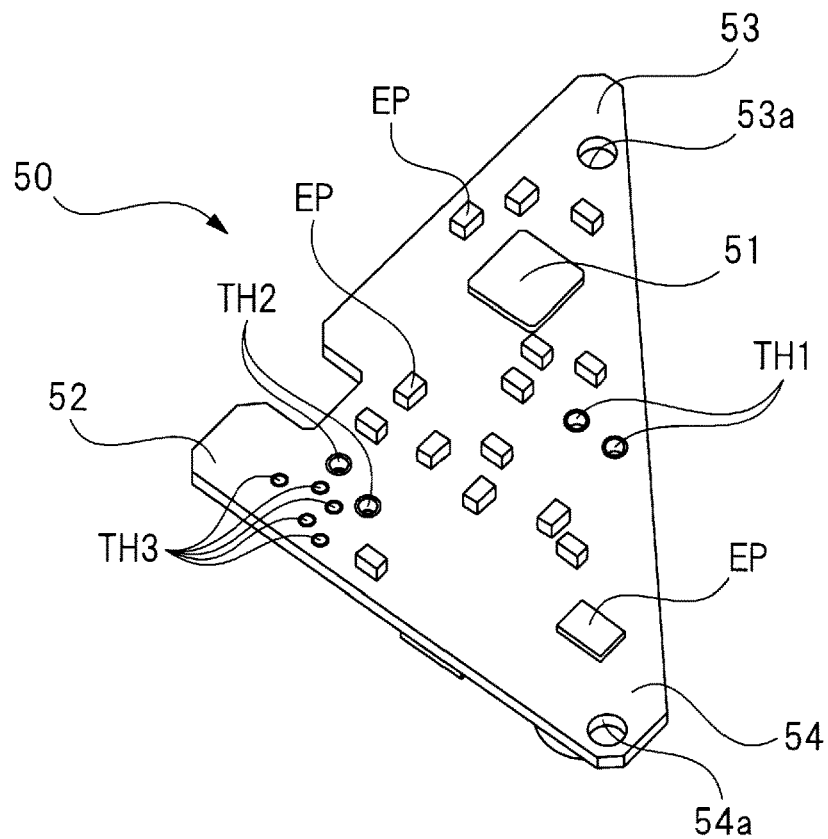
FIG. 10 is a perspective view illustrating only a control substrate.

The connector member 60 (see FIG. 11) is electrically connected to the brush holder 40 via a control substrate 50 (see FIG. 10). In this manner, a drive current for rotating the armature shaft 25 is supplied to the brush holder 40 (brushes 27) from an external connector CN (see FIG. 17) via the connector member 60 and the control substrate 50.

The holder main body 41 includes a bottom wall 41a that expands in a direction that intersects with an axial direction of the commutator 26 (see FIG. 1) and a side wall 41b that projects in the axial direction of the commutator 26 from the bottom wall 41a. The bottom wall 41a is formed into substantially an oval shape similarly to the sectional shape of the motor case 21, and the side wall 41b includes a pair of arc-shaped walls 41c and a pair of linear walls 41d that face each other. In this manner, the brush holder 40 has a flat shape in accordance with the flat shape of the motor case 21 (see FIG. 2).

Also, the pair of brushes 27 (see FIG. 1) are movably provided on an inward side (not illustrated) surrounded by the bottom wall 41a and the side wall 41b. Therefore, the commutator 26 is rotatably stored inside the holder main body 41. Also, a noise control element including electronic components such as a capacitor and a choke coil is provided in addition to the pair of brushes 27 inside the holder main body 41.

Meanwhile, a first brush-side driving conductive member 43 and a second brush-side driving conductive member 44 that supply a drive current from the external connector CN to the pair of brushes 27 are provided outside the holder main body 41 and outside the bottom wall 41a. The brush-side driving conductive members 43 and 44 are formed into predetermined shapes by performing press-working or the like on thin plates with excellent conductivity made of brass.

The first brush-side driving conductive member 43 is divided into two parts, namely a one-side member 43a and the other-side member 43b. In addition, a terminal A and a terminal B are provided on both sides of the one-side member 43a in the longitudinal direction. Meanwhile, a terminal C is provided on one side of the other-side member 43b in the longitudinal direction. Also, the other side of the other-side member 43b in the longitudinal direction is electrically connected to one of the brushes 27 via another conductive member or the like, which is not illustrated in the drawing.

Meanwhile, the second brush-side driving conductive member 44 is not divided into two parts unlike the first brush-side driving conductive member 43. Also, a terminal D is provided on one side of the second brush-side driving conductive member 44 in the longitudinal direction. Meanwhile, the other side of the second brush-side driving conductive member 44 in the longitudinal direction is electrically connected to the other brush 27 via another conductive member or the like, which is not illustrated in the drawing.

Further, one positive temperature coefficient (PTC) 45 as an electronic component is provided outside the holder main body 41 and outside the bottom wall 41*a*. The PTC 45 is a semiconductor that has positive (+) and negative (−) polarities and has an electrical resistance increasing with a temperature rise. In other words, the PTC 45 has a function as a heat protecting component for preventing the motor unit 20 from being damaged due to overheating.

The PTC 45 includes a one-side terminal 45*a* and the other-side terminal 45*b*. Also, the one-side terminal 45*a* of the PTC 45 is electrically connected to the terminal B of the one-side member 43*a* through spot welding or the like. Meanwhile, the other-side terminal 45*b* of the PTC 45 is electrically connected to the terminal C of the other-side member 43*b* through spot welding or the like. In this manner, the PTC 45 is provided at a midpoint of the first brush-side driving conductive member 43, and the supply of the drive current to one of the brushes 27 is thus reduced with a temperature rise. Therefore, it is possible to prevent the motor unit 20 from being further overheated.

In addition, a pair of first spaces SP1 that are relatively wide and a pair of second spaces SP2 that are narrower than the first spaces SP1 are provided outside the holder main body 41 and outside the bottom wall 41*a*. The pair of first spaces SP1 are provided between the arc-shaped walls 41*c* and the bearing holding tube 42, and the pair of second spaces SP2 are provided between the linear walls 41*d* and the bearing holding tube 42.

In addition, the terminal A of the one-side member 43*a* and the terminal D of the second brush-side driving conductive member 44 are disposed in one of the first spaces SP1. Also, the PTC 45, the terminal B of the one-side member 43*a*, the other-side member 43*b* that has the terminal C, and the other side of the second brush-side driving conductive member 44 in the longitudinal direction are disposed in the other first space SP1.

Here, the one-side member 43*a* and the second brush-side driving conductive member 44 cross the pair of second spaces SP2, respectively. Specifically, the one-side member 43*a*, the second brush-side driving conductive member 44, and the holder main body 41 are provided such that the plate thickness direction of the one-side member 43*a*, the plate thickness direction of the second brush-side driving conductive member 44, and the radial direction of the holder main body 41 conform to each other as illustrated in FIG. 3. This realizes the flattening of the brush holder 40.

As illustrated in FIG. 4, the PTC securing unit 46 to which the PTC 45 (see FIG. 3) is secured is provided in the other first space SP1. Also, illustration of FIG. 4, the PTC 45 is omitted for easiness in understanding of the structure of the PTC securing unit 46. The PTC securing unit 46 is a hollow space with substantially a rectangular parallelepiped shape, and the PTC 45 is attached to the inside thereof from the inside toward the outside (from the lower side toward the upper side in the drawing) of the holder main body 41 (see FIG. 5).

Also, a hooking claw 46*a* that can elastically be deformed in a direction that intersects the axial direction of the commutator 26 is provided at a portion of the PTC securing unit 46 corresponding to the inside of the holder main body 41. The hooking claw 46*a* is provided integrally with the bottom wall 41*a* of the holder main body 41 and is configured to prevent falling (dropping) of the PTC 45 secured to the PTC securing unit 46. In other words, the PTC 45 is hooked at the hooking claw 46*a*, and movement of the PTC 45 on one side in the axial direction of the commutator 26 (the lower side in the drawing) is thus restricted.

Also, a surrounding wall 46*b* formed into substantially a U shape when seen in the axial direction (upper side in the drawing) of the commutator 26 is provided at a portion of the PTC securing unit 46 corresponding to the outside of the holder main body 41, which is close to the bearing holding tube 42. The surrounding wall 46*b* includes a recessed space 46*c*, and the recessed space 46*c* penetrates in the axial direction of the commutator 26.

The terminal B of the one-side member 43*a* is disposed, and also the one-side terminal 45*a* (see FIG. 3) of the PTC 45 is disposed in the recessed space 46*c*. In other words, the surrounding wall 46*b* surrounds both the terminal B and the one-side terminal 45*a* in the radial direction of the commutator 26. Also, the recessed space 46*c* of the surrounding wall 46*b* stores the terminal B and the one-side terminal 45*a* in an overlapping state (a state in which the terminal B and the one-side terminal 45*a* are connected to each other) such that the terminal B and the one-side terminal 45*a* do not cause backlash. Specifically, the surrounding wall 46*b* restricts movement of the PTC 45 in the radial direction and on the other side (upper side in the drawing) in the axial direction of the commutator 26 in a state in which the PTC 45 is secured to the PTC securing unit 46.

In this manner, the PTC 45 does not cause backlash with respect to the brush holder 40 in both the radial direction and the axial direction of the commutator 26. Therefore, there are no problems such as peeling off of the electrically connected portion (spot-welded portion).

Here, in order to secure the PTC 45 to the PTC securing unit 46, the PTC 45 is caused to face the inside (the lower side in the drawing) of the holder main body 41 first as illustrated in FIG. 5. At this time, the one-side terminal 45*a* of the PTC 45 is caused to match the recessed space 46*c* (terminal B) of the surrounding wall 46*b*. In addition, the other-side terminal 45*b* of the PTC 45 is caused to match the terminal C.

Thereafter, the PTC 45 is caused to move toward the PTC securing unit 46 as represented by the arrow M1, and the PTC 45 is thus secured to the PTC securing unit 46. At this time, the hooking claw 46*a* is elastically deformed in the process of the movement of the PTC 45. Then, the one-side terminal 45*a* is inserted into the recessed space 45*c*, and the side (lower side in the drawing) opposite to the pair of terminals 45*a* and 45*b* of the PTC 45 is hooked at the hooking claw 46*a* by continuously moving the PTC 45.

In this manner, the structure for securing the PTC 45 to the PTC securing unit 46 is a so-called snap-fitting securing structure that causes elastic deformation of the hooking claw 46*a*. Therefore, it is possible to fixedly secure the PTC 45 to the PTC securing unit 46 through a one-touch operation. Thereafter, the one-side terminal 45*a* and the other-side terminal 45*b* are electrically connected to the terminal B and the terminal C, respectively, through spot welding.

Here, only the side of the one-side terminal 45*a* (terminal B) is supported by the surrounding wall 46*b* in the embodiment, and this is because the other-side terminal 45*b* (terminal C) does not cause backlash as well by causing the surrounding wall 46*b* to support only the side of the one-side terminal 45*a* (terminal B). However, if there is room in a space of the brush holder 40, the surrounding wall may also be provided on the side of the other-side terminal 45*b* (terminal C). In this case, it is possible to further effectively curb backlash of the PTC 45 with respect to the brush holder 40.

As illustrated in FIGS. 6 and 7, the terminal A of the one-side member 43*a* and the terminal D of the second brush-side driving conductive member 44 are disposed in one of the first spaces SP1. Here, a pair of substrate-side driving conductive members 33g and 33h (see FIG. 9) incorporated in the gear case 31 are caused to abut on and be electrically connected to the terminal A and the terminal D at the time of the assembly of the motor device 10 (see FIG. 1). Therefore, it is necessary to secure the terminal A and the terminal D to the brush holder 40 such that no backlash occurs.

The terminal A and the terminal D are provided parallel to each other, and both the terminal A and the terminal D extend in a projecting direction (the upward-downward direction in the drawing) of the bearing holding tube 42. In other words, the distal end sides (the upper side in the drawing) of the terminal A and the terminal D are directed to the distal end side (the side of the bearing member BG) of the bearing holding tube 42.

In addition, inserting units 43c and 44a extending in a direction opposite to the projecting direction of the bearing holding tube 42 are provided on the proximal end sides (the lower side in the drawing) of the terminal A and the terminal D, respectively, as illustrated in FIG. 7. In addition, the inserting units 43c and 44a are inserted into a pair of insertion holes 41e provided at the bottom wall 41a of the holder main body 41 through press-fitting.

Further, a pair of projecting pieces 43d and a pair of projecting pieces 44b are provided on proximal end sides of the terminal A and the terminal D, respectively. Specifically, the pair of projecting pieces 43d project from the terminal A such that the projecting pieces 43d face each other in the extending direction of the one-side member 43a, and the pair of projecting pieces 44b project from the terminal D such that the projecting pieces 44b face each other in the extending direction of the second brush-side driving conductive member 44. In addition, the projecting pieces 43d and 44b abut on a support wall 41f (the cross-hatched portion in FIG. 7) at the bottom wall 41a in the axial direction of the commutator 26. In other words, the plurality of projecting pieces 43d and 44b are respectively supported by the bottom wall 41a.

In this manner, the one inserting unit 43c and the pair of projecting pieces 43d on both sides thereof are provided on the proximal end side of the terminal A, the one inserting unit 44a and the pair of projecting pieces 44b on both sides thereof are provided on the proximal end side of the terminal D, the inserting units 43c and 44a are respectively inserted into the insertion holes 41e, and the support wall 41f of the bottom wall 41a is caused to support the two projecting pieces 43d and the two projecting pieces 44b.

In this manner, securing strength of the terminal A and the terminal D on the proximal end side with respect to the brush holder 40 (the bottom wall 41a) is enhanced. Therefore, wobbling and bending of the terminal A and the terminal D are prevented when the pair of substrate-side driving conductive members 33g and 33h (see FIG. 9) incorporated in the gear case 31 are connected to the terminal A and the terminal D, respectively. Such a securing structure of the terminal A and the terminal D on the proximal end side is effective, for example, in a case in which the length dimensions of the terminal A and the terminal D are relatively long as illustrated in FIG. 6, in particular.

Here, in order to respectively secure the one-side member 43a and the second brush-side driving conductive member 44 to the bottom wall 41a of the holder main body 41, the one-side member 43a and the second brush-side driving conductive member 44 are caused to face the outside (the upper side in the drawing) of the holder main body 41 first as illustrated in FIG. 7. At this time, the respective inserting units 43c and 44a are caused to face the insertion holes 41e, and the respective projecting pieces 43d and 44b are caused to face the support wall 41f of the bottom wall 41a.

Thereafter, the one-side member 43a and the second brush-side driving conductive member 44 are caused to move toward the bottom wall 41a of the holder main body 41 as represented by the arrow M2, and the one-side member 43a and the second brush-side driving conductive member 44 are thus secured to the bottom wall 41a. At this time, the inserting units 43c and 44a are pressed completely into the insertion holes 41e such that lower end surfaces of the respective projecting pieces 43d and 44b are brought into close contact with the support wall 41f of the bottom wall 41a.

In this manner, the one-side member 43a and the second brush-side driving conductive member 44 are precisely secured to the bottom wall 41a of the holder main body 41 without causing backlash as illustrated in FIG. 6. Since no securing means such as an adhesive or a securing screw is used at this time, it is possible to easily secure the one-side member 43a and the second brush-side driving conductive member 44 to the bottom wall 41a of the holder main body 41.

Next, a structure of the gear unit 30 that forms the motor device 10 will be described in detail with reference to FIGS. 8 to 15.

Figure 8:
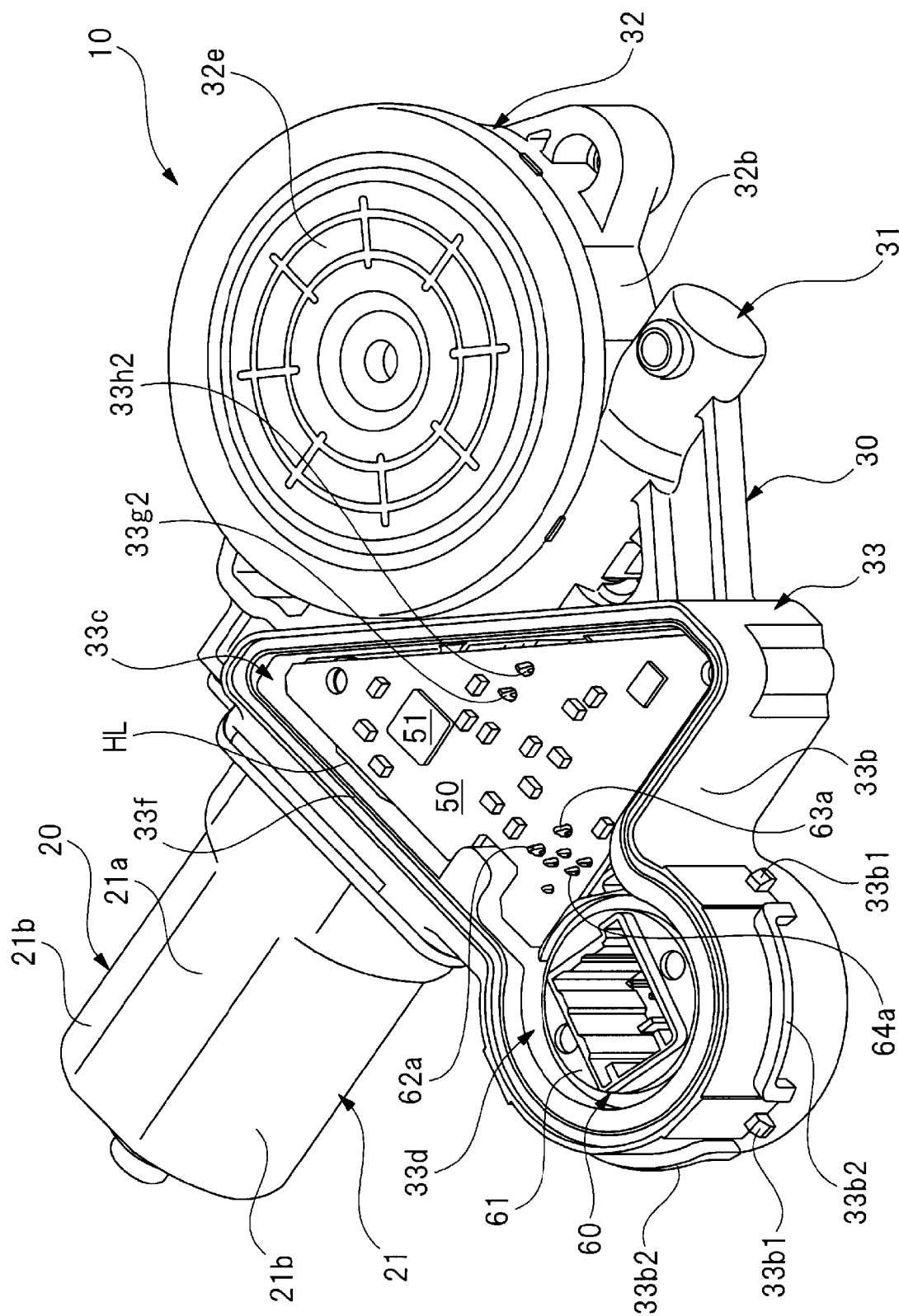
FIG. 8 is a perspective view illustrating the motor device in a state in which a cover member has been detached therefrom.
Figure 11:
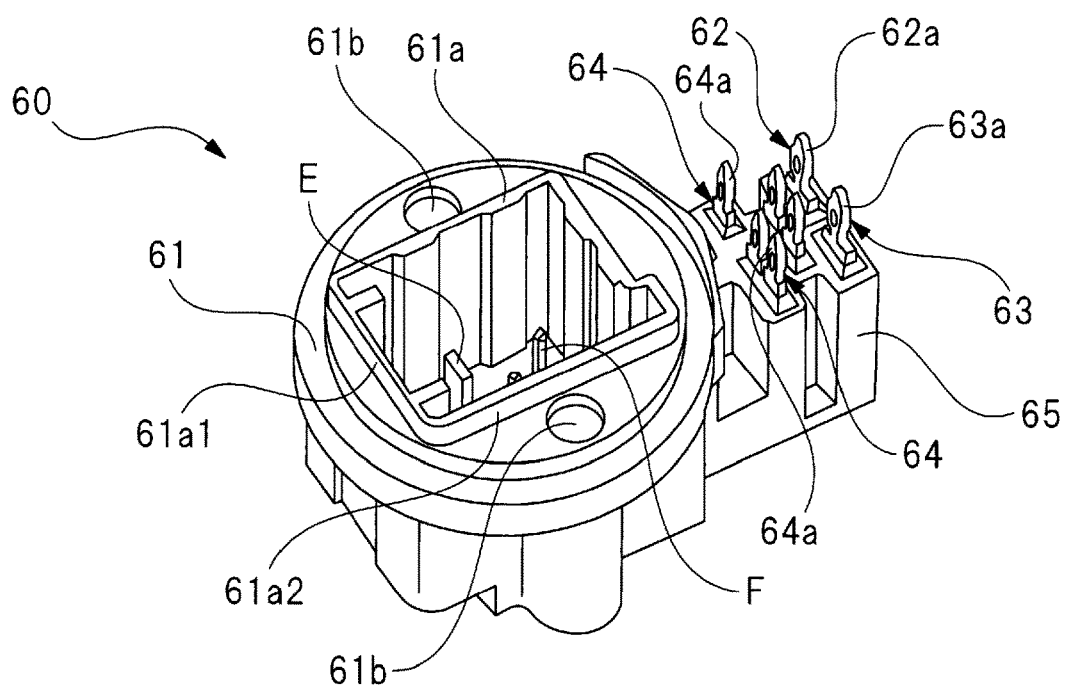
FIG. 11 is a perspective view illustrating only a connector member.

FIG. 8 is a perspective view illustrating the motor device in a state in which the cover member has been detached therefrom, FIG. 9 is a perspective view illustrating only the gear case, FIG. 10 is a perspective view illustrating only the control substrate, FIG. 11 is a perspective view illustrating only the connector member, (a) and (b) of FIG. 12 are perspective views illustrating only the cover member, FIG. 13 is a plan view for explaining a flow of a resin when the cover member is molded, FIG. 14 is a perspective view illustrating an abutting portion between the cover member and the connector member, and (a), (b), and (c) of FIG. 15 are explanatory diagrams for explaining a procedure for producing the cover member.

As illustrated in FIGS. 8 and 9, the gear unit 30 includes the gear case (housing) 31 formed into a predetermined shape using a resin material such as plastic. The gear case 31 includes a gear storage unit 32 and an electric component storage unit 33. In addition, illustration of a cover member 70 (see FIG. 12) configured to tightly close the electric component storage unit 33 is omitted in FIG. 8 for easiness in understanding of an internal structure of the electric component storage unit 33.

As illustrated in FIG. 9, the gear storage unit 32 includes a bottom wall 32a and a side wall 32b surrounding the periphery thereof and is formed into substantially a bottomed cylindrical shape. Also, the worm gear 29 and the worm wheel 32c (see FIG. 1) that configure the deceleration mechanism SD are rotatably stored inside the gear storage unit 32 in a mutually engaged state.

In addition, an opening 32d is formed in the gear storage unit 32, and the opening 32d is tightly closed with a disk cover 32e formed into substantially a disk shape using a stainless steel plate or the like. Also, the output shaft 32f caused to rotate by the worm wheel 32c projects outward from the bottom wall 32a of the gear storage unit 32 as illustrated in (b) of FIG. 1. Here, an output (rotational force) of the output shaft 32f is transmitted to the window regulator (not illustrated).

Further, a total of three attachment tubes 32g are integrally provided in the periphery of the gear storage unit 32 as illustrated in (b) of FIG. 1. Securing bolts (not illustrated)

for securing the motor device 10 to a bracket BR (see FIG. 17) provided in the door (not illustrated) of the vehicle are inserted into the attachment tubes 32g.

The electric component storage unit 33 includes a bottom wall 33a and a side wall 33b surrounding the periphery thereof. The electric component storage unit 33 is formed to have a sectional shape in a direction that intersects the axial direction of the output shaft 32f (see (b) of FIG. 1) formed into a shape as a combination of substantially a triangular shape and substantially a circular shape. Specifically, the portion of the electric component storage unit 33 formed into the substantially triangular shape serves as the substrate storage unit 33c, and the portion formed into the substantially circular shape serves as the connector storage unit 33d. In addition, the substrate storage unit 33c and the connector storage unit 33d are communicatively continuous with each other inside the electric component storage unit 33.

The volume in the substrate storage unit 33c is larger than the volume in the connector storage unit 33d. The substrate storage unit 33c is disposed in the proximity of the gear storage unit 32 that occupies a relatively large portion in the gear case 31. Meanwhile, the connector storage unit 33d is disposed on the side opposite to the side of the gear storage unit 32 with respect to the substrate storage unit 33c. Therefore, an unnecessary increase in outline of the gear case 31 is curbed.

An opening 33e of the electric component storage unit 33 (the substrate storage unit 33c and the connector storage unit 33d) is tightly closed with the cover member 70 (see FIG. 12) formed into a predetermined shape using a resin material such as plastic. A case-side welding unit 33f is provided on the side of the opening 33e in the side wall 33b that forms the electric component storage unit 33 to follow the shape of the electric component storage unit 33. The case-side welding unit 33f is a portion projecting from an end of the side wall 33b with a minute height, at which the cover member 70 is welded through laser welding.

Also, a total of three engagement claws 33b1 (only two of them are illustrated in the drawing) are provided outside the side wall 33b and at a portion corresponding to the connector storage unit 33d. The engagement claws 33b1 are provided to project outward in the radial direction of the connector storage unit 33d from the side wall 33b. In addition, notch holes 81b1 (see FIG. 16) of securing legs 81b of a grommet member 80 are adapted to be hooked at the three engagement claws 33b1. In other words, the three engagement claws 33b1 are for securing the grommet member 80 to the gear case 31.

The three engagement claws 33b1 are disposed at the connector storage unit 33d on the side opposite to the side of the substrate storage unit 33c and is provided at about 90 degrees in the periphery of the connector storage unit 33d. In addition, stopper walls 33b2 are provided between adjacent engagement claws 33b1. Two stopper walls 33b2 are provided, and the stopper walls 33b2 are provided to project outward in the radial direction of the connector storage unit 33d from the side wall 33b. The pair of stopper walls 33b2 restricts the amount of movement of the grommet member 80 with respect to the gear case 31 along the axial direction of the output shaft 32f. In this manner, a pair of motor-side lip seals 82a1 and 82a2 (see FIG. 16) of the grommet member 80 are prevented from being excessively collapsed and damaged.

The first substrate-side driving conductive member (motor-side conductive member) 33g and the second substrate-side driving conductive member (motor-side conductive member) 33h are incorporated inside the gear case 31 and inside the substrate storage unit 33c through insert molding. More specifically, the substrate-side driving conductive members 33g and 33h are formed into predetermined shape by performing press-working or the like on thin plates with excellent conductivity made of brass or the like.

Here, the substrate-side driving conductive members 33g and 33h are in a unitized state in advance when the gear case 31 is incorporated inside the substrate storage unit 33c through injection molding. In other words, the pair of substrate-side driving conductive members 33g and 33h are formed as one conductive member unit UT (see FIG. 19), and the pair of substrate-side driving conductive members 33g and 33h can be easily and precisely disposed at predetermined locations of the gear case 31 by incorporating the conductive member unit UT in the gear case 31 through insert molding. In this manner, the pair of substrate-side driving conductive members 33g and 33h are provided at the gear case 31 in the unitized state through insert molding.

Also, one side of the pair of substrate-side driving conductive members 33g and 33h in the longitudinal direction is formed as tip-split-shaped terminals 33g1 and 33h1, each of which is split into two on the proximal end side, as illustrated in FIG. 19. Also, the terminal A of the one-side member 43a is held in a pinched manner at the tip-split-shaped terminal 33g1 of the first substrate-side driving conductive member 33g in a state in which the motor device 10 is assembled. Meanwhile, the terminal D of the second brush-side driving conductive member 44 is held in a pinched manner at the tip-split-shaped terminal 33h1 of the second substrate-side driving conductive member 33h.

Also, the other side of the pair of substrate-side driving conductive members 33g and 33h in the longitudinal direction is directed in the opening direction of the substrate storage unit 33c (the axial direction of the output shaft 32f) as illustrated in FIGS. 9 and 19. Also, the other side of the substrate-side driving conductive members 33g and 33h in the longitudinal direction forms first elastic deformation terminals (first terminals) 33g2 and 33h2 inserted into two first drive current through-holes TH1 (see FIG. 10) provided in the control substrate 50 with elastic deformation. In other words, the pair of first elastic deformation terminals 33g2 and 33h2 extend in the direction that intersects the axial direction of the armature shaft 25 (the axial direction of the output shaft 32f).

In this manner, it is possible to definitively establish electrical connection between the pair of first elastic deformation terminals 33g2 and 33h2 and the two first drive current through-holes TH1 in the control substrate 50 merely by inserting the first elastic deformation terminals 33g2 and 33h2 into the first drive current through-holes TH1. Therefore, it is possible not only to make a connecting operation such as soldering unnecessary but also to form a stable electric circuit with less variations in the respective products.

Here, a through-hole HL (see FIGS. 8 and 9) are provided at the substrate storage unit 33c in the vicinity of the motor case 21 in the state in which the motor device 10 is assembled. The through-hole HL penetrates between the side of the substrate storage unit 33c on which the control substrate 50 is provided, and the side of the gear case 31 on which the brush holder 40 is provided. In addition, the one-side member 43a (see FIGS. 2 and 3) disposed in one of the second spaces SP2 of the brush holder 40 is disposed in the through-hole HL in the state in which the motor device 10 is assembled. In this manner, the brush holder 40 and the control substrate 50 are disposed such that the brush holder 40 and the control substrate 50 are close to each other by providing the through-hole HL at the gear case 31 and disposing the one-side member 43a at the through-hole HL. This also realizes a decrease in thickness of the gear case 31 and a decrease in weight of the motor device 10.

As illustrated in FIG. 9, the opening direction of the opening 32d at the gear storage unit 32 and the opening direction of the opening 33e at the electric component storage unit 33 are the direction that intersects the axial direction of the armature shaft 25, specifically, the axial direction of the output shaft 32f. Therefore, the opening direction of the substrate storage unit 33c and the opening direction of the connector storage unit 33d are also the axial direction of the output shaft 32f.

In this manner, the opening areas of the substrate storage unit 33c and the connector storage unit 33d, that is, the opening area of the opening 33e is set to be large with the gear case 31 keeping the flat shape. Therefore, it is possible to easily perform the operation of storing the worm wheel 32c, the control substrate 50, and the connector member 60 in the gear case 31 in the same direction (the axial direction of the output shaft 32f), respectively. Therefore, it is possible to simplify the process of assembling the motor device 10 and to easily assemble the motor device 10 with an automatic assembly device or the like.

As illustrated in FIG. 10, the control substrate 50 stored in the substrate storage unit 33c is formed into substantially a triangular shape using an epoxy resin, a phenol resin, or the like to follow the triangular shape of the substrate storage unit 33c. In other words, the control substrate 50 is accommodated in the substrate storage unit 33c with no gap as illustrated in FIG. 8 by storing the control substrate 50 in the substrate storage unit 33c. Therefore, backlash of the control substrate 50 in the substrate storage unit 33c is effectively curbed.

In addition, a plurality of electronic components EP such as an integrated circuit 51 and a chip resistor are mounted on the control substrate 50. In this manner, the amount of drive current supplied to the pair of brushes 27 (see FIG. 1), that is, the rotation state of the armature shaft 25 (see FIG. 1) is controlled.

Here, a plurality of hall ICs (not illustrated) are mounted in addition to the integrated circuit 51 and the plurality of electronic components EP on the control substrate 50. The hall ICs are rotation sensors configured to detect the rotation state of the armature shaft 25 and output rectangular waves using rotation of a sensor magnet (not illustrated) secured to the armature shaft 25. In this manner, the integrated circuit 51 monitors a frequency of appearance of the rectangular waves, recognizes that the armature shaft 25 is in a suspended state and the like, and causes the supply of the drive current to the pair of brushes 27 to stop.

Three corners 52, 53, and 54 are provided at the control substrate 50 formed into the substantially triangular shape. Positioning holes 53a and 54a that penetrate the control substrate 50 in the plate thickness direction are provided in the vicinity of two corners 53 and 54 among the corners 52, 53, and 54. The positioning holes 53a and 54a are adapted such that short positioning pins 221d of an automatic assembly device 200 (see FIGS. 21 to 23) are inserted thereinto when the motor device 10 is assembled. In this manner, it is possible to precisely store the control substrate 50 in the substrate storage unit 33c of the gear case 31.

In addition, a pair of pin receiving holes (housing holes) 33k that face the pair of positioning holes 53a and 54a are provided at the substrate storage unit 33c in the axial direction of the output shaft 32f as illustrated in FIG. 9. In this manner, the short positioning pins 221d are inserted into the pin receiving holes 33k and the control substrate 50 is precisely positioned with respect to the substrate storage unit 33c when the automatic assembly device 200 stores the control substrate 50 in the substrate storage unit 33c.

In addition, the two first drive current through-holes (through-holes) TH1 are provided between the corner 53 and the corner 54 of the control substrate 50. The first elastic deformation terminal 33g2 of the first substrate-side driving conductive member 33g and the first elastic deformation terminal 33h2 of the second substrate-side driving conductive member 33h (see FIG. 9 and FIG. 19) are inserted into the first drive current through-holes TH1 with elastic deformation.

Further, two second drive current through-holes (through-holes) TH2 and five control current through-holes (through-holes) TH3 are provided in the vicinity of the corner 52 of the control substrate 50. A second elastic deformation terminal 62a of a first power source-side driving conductive member 62 and a second elastic deformation terminal 63a (see FIG. 11) of a second power source-side driving conductive member 63 of the connector member 60 are inserted into the two second drive current through-holes TH2 with elastic deformation. Meanwhile, third elastic deformation terminals 64a of five control conductive members 64 provided at the connector member 60 are inserted into five control current through-holes TH3 with elastic deformation.

Here, the five control conductive members 64 are adapted to cause a control current indicating an operating state of the motor device 10 to flow to another in-vehicle device (not illustrated) and to cause a control current indicating on and off from a power window switch (not illustrated) in the interior of the vehicle to flow.

As illustrated in FIG. 11, the connector member 60 stored in the connector storage unit 33d includes a circular main body unit 61 formed into substantially a circular shape to follow the circular shape of the connector storage unit 33d. If the circular main body unit 61 is stored in the connector storage unit 33d, then the circular main body unit 61 is accommodated in the connector storage unit 33d with no gap as illustrated in FIG. 8. Therefore, backlash of the connector member 60 in the connector storage unit 33d is effectively curbed.

The connector member 60 is formed by injection-molding a resin material such as plastic, and the first power source-side driving conductive member (connector-side conductive member) 62 and the second power source-side driving conductive member (connector-side conductive member) 63 are incorporated therein through insert molding. Also, the five control conductive members (connector-side conductive members) 64 in addition to the pair of power source-side driving conductive members 62 and 63 are incorporated inside the connector member 60 through insert molding.

A connector connecting unit 61a that is opened in the axial direction of the output shaft 32f is provided at the circular main body unit 61 in the state in which the motor device 10 is assembled. The connector connecting unit 61a is formed into substantially a square shape when seen in the axial direction of the output shaft 32f and includes a short side unit 61a1 and a long side unit 61a2. In addition, the external connector CN (see FIG. 17) on the side of the vehicle is inserted into and connected to the connector connecting unit 61a. In this manner, the external connector CN and the connector member 60 are electrically connected, and the drive current is supplied to the motor device 10. In addition, a state in which the motor device 10 can communicate with another in-vehicle device is achieved.

Terminals E (only some of the terminals E is illustrated in the drawing) provided on one side of the pair of power source-side driving conductive members 62 and 63 in the longitudinal direction and terminals F (only some of the terminals F is illustrated in the drawing) provided on one side of the five control conductive members 64 are exposed inside the connector connecting unit 61a. Also, the plurality of terminals E and F are male terminals and are inserted into a plurality of female terminals (not illustrated) inside the external connector CN.

A pair of positioning holes (connector holes) 61b are provided at the circular main body unit 61. The positioning holes 61b extend in an axial direction of the circular main body unit 61 (the axial direction of the output shaft 32f) and are disposed to face each other with the connector connecting unit 61a located at the center. The positioning holes 61b are adapted such that long positioning pins 221e of the automatic assembly device 200 (see FIGS. 21 to 23) are inserted thereinto when the motor device 10 is assembled. In this manner, it is possible to precisely store the connector member 60 in the connector storage unit 33d of the gear case 31.

Also, a substrate-side block 65 formed into substantially a rectangular parallelepiped shape is integrally provided at an outer peripheral portion of the circular main body unit 61 such that the substrate-side block 65 projects in the radial direction thereof. The substrate-side block 65 is disposed such that the substrate-side block 65 sticks out of the connector storage unit 33d on the side of the substrate storage unit 33c inside the electric component storage unit 33 in the gear case 31. In this manner, the substrate-side block 65 overlaps with the control substrate 50 when seen in the axial direction of the output shaft 32f in the state in which the motor device 10 is assembled (see FIG. 8).

The second elastic deformation terminals (second terminals) 62a and 63a provided on the other side of the pair of power source-side driving conductive members 62 and 63 in the longitudinal direction and the third elastic deformation terminal (second terminal) 64a provided on the other side of the five control conductive members 64 in the longitudinal direction are provided in a projecting manner at the substrate-side block 65. More specifically, the second and third elastic deformation terminals 62a, 63a, and 64a extend in the direction that intersects the axial direction of the armature shaft 25 (the axial direction of the output shaft 32f).

In addition, the second and third elastic deformation terminals 62a, 63a, and 64a are inserted into the second drive current through-holes TH2 and the control current through-holes TH3 (see FIG. 10) provided at the control substrate 50 with elastic deformation. Therefore, it is possible to definitively and electrically connect the second and third elastic deformation terminals 62a, 63a, and 64a and the through-holes TH2 and TH3 at the control substrate 50 merely by inserting the second and third elastic deformation terminals 62a, 63a, and 64a into the through-holes TH2 and TH3. Therefore, it is possible not only to make a connecting operation such as soldering unnecessary but also to form a stable electric circuit with less variations in the respective products.

As illustrated in FIG. 12, the cover member 70 that closes blocks the electric component storage unit 33 of the gear case 31 includes a connector cover unit 71 formed into substantially an annular shape and a substrate cover unit 72 formed into substantially a triangular shape. Also, the cover member 70 is formed into substantially a flat panel shape by pressure-feeding a molten resin MR into a cavity CA inside upper and lower molds 110 and 120 as illustrated in FIG. 15. In other words, the cover member 70 is an injection-molded article.

An exposure hole 71a is formed inside the connector cover unit 71 in the radial direction thereof at a portion at which a part of the connector storage unit 33d of the electric component storage unit 33 is tightly closed. The exposure hole 71a causes the connector connecting unit 61a of the connector member 60 to be exposed to the outside as illustrated in FIG. 14. In this manner, it is possible to connect the external connector CN (see FIG. 17) to the connector connecting unit 61a in a state in which the cover member 70 is attached to the electric component storage unit 33.

As illustrated at the hatched portion in FIG. 13, a first securing unit 71b secured to the case-side welding unit 33f (see FIG. 9) of the gear case 31 through laser welding is provided inside the connector cover unit 71 and on the outward side in the radial direction. The first securing unit 71b is provided such that the first securing unit 71b outlines the outer peripheral portion of the connector cover unit 71.

Here, the cover member 70 is formed of a white (light color) resin material such that a laser beam LS (see FIG. 25) is transmitted therethrough at the time of laser welding. Meanwhile, the gear case 31 (the case-side welding unit 33f) is formed of a black (dark color) resin material that absorbs the laser beam LS. Therefore, only the case-side welding unit 33f is melted without melting the cover member 70 through irradiation with the laser beam LS, and the cover member 70 is thus welded at the gear case 31 without any distortion.

An annular thick unit 71c projecting in the axial direction of the output shaft 32f is provided inside the connector cover unit 71 in the radial direction. The annular thick unit 71c is thicker than the other portions of the connector cover unit 71, and the projecting direction of the annular thick unit 71c is directed to the inside of the electric component storage unit 33 (see FIGS. 17 and 25) in the state in which the motor device 10 is assembled. In addition, a distal end portion (the hatched portion in FIG. 13) of the annular thick unit 71c is pressed against a packing seal SL made of rubber as illustrated in FIG. 17. In this manner, rainwater or the like is prevented from entering the inside of the electric component storage unit 33 from the exposure hole 71a.

In this manner, the case-side welding unit 33f is welded at the first securing unit 71b represented as the hatched portion in FIG. 13, and the proximal end portion of the annular thick unit 71c represented as the hatched portion in FIG. 13 is pressed against the packing seal SL. In other words, the first securing unit 71b and the distal end portion of the annular thick unit 71c are portions that play important roles in securing welding strength and sealing properties, and it is necessary to enhance rigidity by eliminating distortion of the portions. In other words, low rigidity and distortion at the portions lead to degradation of the welding strength and the sealing properties.

Here, a gate GT used for injection-molding the cover member 70 is provided outside the cover member 70 and between the corner 72c and the corner 72d of the substrate cover unit 72 as illustrated in (a) of FIG. 12. Specifically, the gate GT is provided at a portion between the corner 72c and the corner 72d, which is close to one of the corners, namely the corner 72d. Also, the gate GT is provided at a portion between a pair of support projections 72c1 and 72d1 provided at the substrate cover unit 72, which is close to one of the support projections, namely the support projection 72d1 as illustrated in FIG. 13 when seen from the inside of the cover member 70. Also, the molten resin MR (see FIG. 15)

flows as represented by the arrow of the dashed line in FIG. 13 when the cover member 70 is injection molded. Therefore, a weld line WL is formed at a portion of the connector cover unit 71 that is furthest from the gate GT.

Here, the weld line WL is a portion into which the molten resin MR flowing from a facing direction is brought into contact and a portion with a weak structure (low rigidity). Therefore, the portion of the connector cover unit 71 at which the weld line WL is formed is caused to have a wider thickness than those of the other portions of the connector cover unit 71, and the wide width unit 71d enhances rigidity at the weld line WL portion. Specifically, the wide width unit 71d is thicker than the other portions of the connector cover unit 71 in the radial direction of the connector cover unit 71. Therefore, distortion of the first securing unit 71b and the distal end portion of the annular thick unit 71c due to formation of the weld line WL is effectively curbed.

In addition, functions of the wide width unit 71d include two functions as described below in addition to the aforementioned function of enhancing the rigidity at the portion at which the weld line WL is formed.

First, a portion (non-hatched portion) which is not pressed against the packing seal SL is formed inside the annular thick unit 71c in the radial direction, the portion is pressed with pressing pins 113 (see FIG. 15) provide at the lower mold 110, and the completed cover member 70 is thus released from the lower mold 110. In other words, the wide width unit 71d has a function of keeping flatness of the distal end portion of the annular thick unit 71c that is pressed against the packing seal SL and preventing distortion of the connector cover unit 71 when the cover member 70 is released from the mold.

Here, a total number of pressing points OP in the cover member 70, which are pressed with the pressing pins 113, in the embodiment is seven as illustrated in FIG. 13. The pressing points OP are provided in a dispersed manner over the entire cover member 70, and distortion occurring when the cover member 70 formed into the substantially flat plate shape is released from the mold is thus effectively curbed.

Second, a connector support wall 71d1 that abuts on the short side unit 61a1 of the connector connecting unit 61a and supports the connector connecting unit 61a is provided inside the wide width unit 71d (on the side of the connector connecting unit 61a) as illustrated in FIG. 14. In other words, the wide width unit 71d has a function of preventing the connector member 60 (see FIG. 8) stored in the connector storage unit 33d from causing backlash inside the connector storage unit 33d. Therefore, it is possible to easily insert the external connector CN (see FIG. 17) straight into the connector connecting unit 61a without being pinched.

As illustrated in FIGS. 12 and 13, the substrate cover unit 72 is a portion that tightly closes the substrate storage unit 33c (see FIG. 8) of the electric component storage unit 33. An attachment projecting unit 72a that is fitted into the side wall 33b that forms the substrate storage unit 33c is integrally provided at a portion inside the substrate cover unit 72, which is close to the outer periphery thereof. In this manner, the cover member 70 is attached such that the cover member 70 accurately and tightly close the opening 33e (see FIG. 9) of the electric component storage unit 33 when the motor device 10 is assembled.

Also, as illustrated in the hatched portion in FIG. 13, a second securing unit 72b that is secured to the case-side welding unit 33f (see FIG. 8) of the gear case 31 through laser welding is provided at a portion inside the substrate cover unit 72, which is closer to the outer periphery than the attachment projecting unit 72a. The second securing unit 72b is provided such that the second securing unit 72b outlines the outer peripheral portion of the substrate cover unit 72.

Further, the pair of support projections 72c1 and 72d1 are provided in the vicinity of the corners 72c and 72d that are located at portions of the substrate cover unit 72 that are away from the connector cover unit 71. Here, the projecting directions of the attachment projecting unit 72a and the pair of support projections 72c1 and 72d1 are directed to the inside of the electric component storage unit 33 in the state in which the motor device 10 is assembled.

Also, the pair of support projections 72c1 and 72d1 are adapted to support the vicinity of the corner 53 and the corner 54 (see FIG. 10) of the control substrate 50. In this manner, the control substrate 50 stored in the substrate storage unit 33c is prevented from causing backlash inside the substrate storage unit 33c. Therefore, it is possible to protect the control substrate 50 from vibration and the like and thereby to extend the lifetime of the motor device 10.

Here, as illustrated in FIG. 13, a spiral projecting unit SW formed substantially like a windmill is formed between the pair of support projections 72c1 and 72d1 provided at the substrate cover unit 72 and on the rear side of the gate GT (inside the substrate cover unit 72) disposed at a location that is close to one of the support projections, namely the support projection 72d1. The spiral projecting unit SW is formed by providing a recessed portion (not illustrated) with a similar shape in the lower mold 110 and by the molten resin MR ejected from a molten resin passage 123 of the upper mold 120 colliding against the recessed portion. In this manner, the molten resin MR that has been ejected from the molten resin passage 123 and has flown into the cavity CA flows in a spiral shape and spreads inside the cavity CA. In this manner, the molten resin MR uniformly and thoroughly reaches the inside of the cavity CA, this leads to an increase in strength of the structure of the cover member 70 and thus an increase in rigidity of the cover member 70.

As illustrated in FIG. 15, the cover member 70 is produced by an injection molding device 100. Specifically, the injection molding device 100 includes the lower mold 110 secured to a base (not illustrated) and the upper mold 120 that is driven to lift and lower with respect to the lower mold 110.

A recessed portion 111 for forming the rear side of the cover member 70 (see (b) of FIG. 12) is formed in the lower mold 110. The recessed portion 111 has a complicated shape. Specifically, the recessed portion 111 is configured of a plurality of recessed portions for molding the annular thick unit 71c, the attachment projecting unit 72a, the pair of support projections 72c1 and 72d1, the spiral projecting unit SW, and the like as illustrated in (b) of FIG. 12.

Also, a recessed portion (not illustrated) formed into a spiral shape substantially like a windmill is formed at a portion of the lower mold 110 that faces an exit of the molten resin passage 123 (the upper side in the drawing). Therefore, the spiral projecting unit SW like a windmill is formed at a predetermined location on the rear side (inside) of the substrate cover unit 72 as illustrated in (b) of FIG. 12.

Further, a total of seven pressing pins 113 (only five of them are illustrated in the drawing) are provided in the lower mold 110. All of the pressing pins 113 are driven at the same timing (synchronous drive). Specifically, the pressing pins 113 are driven to be lifted when the cover member 70 cured after the injection molding is released from the lower mold 110.

In this manner, the pressing points OP (see FIG. 13) on the rear side of the cover member 70 are respectively pressed by the pressing pins 113, and the cover member 70 is thus released from the lower mold 110. In other words, the pressing pins 113 are not in a lifted state, that is, a state in which the pressing pins 113 don't project from the recessed portion 111 during the injection molding of the cover member 70.

Meanwhile, a first projecting unit 121 and a second projecting unit 122 that shape the front side of the cover member 70 (see (a) of FIG. 12) are formed in the upper mold 120. Here, the upper mold 120 has a simpler shape than that of the lower mold 110.

In this manner, the cover member 70 does not stick to the upper mold 120 when the injection molding of the cover member 70 is completed and the upper and lower molds 110 and 120 are separated from each other. Therefore, no pressing pins are provided in the upper mold 120.

Also, the first projecting unit 121 with a higher projecting height in the upper mold 120 is adapted to form the exposure hole 71a of the connector cover unit 71 as illustrated in (a) of FIG. 12. Meanwhile, the second projecting unit 122 with a lower projecting height in the upper mold 120 is adapted to reduce the thickness of the substrate cover unit 72 and recess the portion thereof that is close to the center. In this manner, occurrence of distortion (retreating) when the substrate cover unit 72 that occupies a relatively large area is cured (cooled) is prevented by reducing the thickness of the portion of the substrate cover unit 72 that is close to the center.

Also, the molten resin passage 123 through which the molten resin MR flows is provided in the upper mold 120. In addition, a dispenser (molten resin supply device) DP that supplies the molten resin MR to the molten resin passage 123 is provided on the entrance side (the upper side in the drawing) of the molten resin passage 123. The molten resin MR at a predetermined pressure is supplied from the dispenser DP toward the molten resin passage 123.

Next, a specific procedure for producing the cover member 70 will be described in detail with reference to drawings.

[First Producing Process]

First, the upper mold 120 is lowered and moved toward the lower mold 110 as represented by the arrow M3 in (a) of FIG. 15. In this manner, the upper and lower molds 110 and 120 are caused to abut on each other, and the cavity CA that forms the cover member 70 (see FIG. 12) is formed inside of the upper and lower molds 110 and 120 as illustrated in (b) of FIG. 15. In this manner, the first producing process is completed.

[Second Producing Process]

Next, the dispenser DP is caused to operate, and the molten resin MR (white) heated and melted is pressure-fed to the molten resin passage 123 at a predetermined pressure as represented by the arrow M4 as illustrated in (b) of FIG. 15. In this manner, the molten resin MR ejected from the molten resin passage 123 collides against the recessed portion (not illustrated) in the lower mold 110 formed into the spiral shape and flows into the cavity CA such that the molten resin MR uniformly spreads in a spiral manner.

Thereafter, the inside of the cavity CA is filled with the molten resin MR with no gap by causing the dispenser DP to continuously operate. At this time, the molten resin MR flows inside the cavity CA as represented by the arrow of the dashed line in FIG. 13 and reaches the portion that forms the wide width unit 71d, thereby forming the weld line WL. In this manner, the molten resin MR is formed into the shape of the cover member 70 inside the cavity CA, and the second producing process is completed.

[Third Producing Process]

Next, the cover member 70 is hardened by forcibly cooling the upper and lower molds 110 and 120 using a cooling device (not illustrated) or the like. Thereafter, the upper mold 120 is driven to be lifted and is then separated from the lower mold 110 as represented by the arrow M5 in (c) of FIG. 15. Then, the cured cover member 70 remains in the lower mold 110. This is because the contact area between the cover member 70 and the lower mold 110 with the complicated shape is larger than the contact area between the cover member 70 and the upper mold 120 with the simple shape.

Next, the plurality of pressing pins 113 are synchronously driven to be lifted as represented by the arrow M6. In this manner, the pressing points OP (see FIG. 13) on the rear side of the cover member 70 are pressed with the respective pressing pins 113, and the cover member 70 is released from the lower mold 110 as represented by the arrow M7.

At this time, the pressing pin 113 located on the leftmost side in the drawing presses the wide width unit 71d (see FIG. 13) in the vicinity of the distal end portion of the annular thick unit 71c. Therefore, inclined distortion of the connector cover unit 71 with lower rigidity (because of the exposure hole 71a) than that of the substrate cover unit 72 is prevented. In this manner, releasing of the cover member 70 from the upper and lower molds 110 and 120 is completed, and the third producing process is completed.

As illustrated in FIG. 1, the grommet member 80 is attached to the gear case 31 that forms the motor device 10. Hereinafter, the grommet member 80 will be described in detail with reference to drawings.

(a) and (b) of FIG. 16 are perspective views illustrating only the grommet member, and FIG. 17 is a sectional view illustrating the grommet member and the gear case.

As illustrated in FIGS. 1 and 17, the grommet member 80 is provided so as to surround the periphery of the connector connecting unit 61a to which the external connector CN is connected and functions as a seal that prevents foreign matters such as rainwater from reaching the inside of the connector member 60 (connector connecting unit 61a). More specifically, as illustrated in FIG. 17, the grommet member 80 is disposed between the bracket BR to which the gear case 31 of the motor device 10 is secured and the connector storage unit 33d of the gear case 31.

Here, the bracket BR is provided inside the door (not illustrated) of the vehicle, and the upper side of the bracket BR in the drawing corresponds to the inward side of the interior of the vehicle. In other words, a one-side space R1 of the bracket BR on the side on which the external connector CN is pulled out is not exposed to rainwater and the like. Meanwhile, the lower side of the bracket BR communicates with the outside of the interior of the vehicle in the drawing. In other words, the other-side space R2 of the bracket BR on which the motor device 10 is secured may be exposed to rainwater and the like. Therefore, it is necessary to secure dust resistance and water resistance for the motor device 10, and the grommet member 80 is provided so as to surround the periphery of the connector connecting unit 61a.

As illustrated in FIGS. 16 and 17, the grommet member 80 includes a securing member 81 that is secured to the gear case 31 and a grommet main body 82 that is provided integrally with the securing member 81.

The securing member 81 is formed of a resin material such as plastic and includes an annular main body 81a formed into substantially an annular shape and three securing legs 81b provided integrally with the annular main body 81a. The three securing legs 81b extend in an axial direction of the grommet member 80 (the axial direction of the output shaft 32f), and the proximal end side thereof is integrated with the annular main body 81a. In addition, notch holes 81b1 are respectively provided at the three securing legs 81b, and the distal end sides of the notch holes 81b1 are hooked at the three engagement claws 33b1 provided so as to project outward in the radial direction of the connector storage unit 33d from the side wall 33b.

Here, the three securing legs 81b are disposed at the connector storage unit 33d on the side opposite to the side of the substrate storage unit 33c (see FIG. 24) in the state in which the motor device 10 is assembled and are provided at intervals of about 90 degrees in the periphery of the annular main body 81a, similarly to the three engagement claws 33b1.

In addition, stoppers 81c are also provided between adjacent securing legs 81b. Two stoppers 81c are provided, and the stoppers 81c extend in the axial direction of the grommet member 80 (the axial direction of the output shaft 32f). In addition, the pair of stoppers 81c abut on a pair of stopper walls 33b2 (see FIG. 9) in the axial direction of the grommet member 80.

As illustrated in FIG. 17, the grommet main body 82 is formed into substantially a tubular shape using an elastic material such as silicone rubber. In this manner, the grommet main body 82 has sufficient flexibility as compared with the securing member 81. An annular attachment unit 82a with a sectional surface formed into substantially a U shape is provided integrally with one side of the grommet main body 82 in the axial direction (the lower side in the drawing). The annular attachment unit 82a is attached to the inside of the annular main body 81a in the radial direction, and specifically is provided so as to wrap the edge portion of the annular main body 81a located inward in the radial direction. Also, the grommet main body 82 is integrated with the annular main body 81a through insert molding when the grommet main body 82 is injection-molded.

The pair of motor-side lip seals 82a1 and 82a2 projecting toward one side of the grommet main body 82 in the axial direction are provided at the lowermost end in the drawing on one side of the annular attachment unit 82a in the axial direction and along the axial direction of the grommet main body 82. Here, one of the motor-side lip seals, namely the motor-side lip seal 82a1 is disposed inward in the radial direction of the annular attachment unit 82a, and the other one of the motor-side lip seals, namely the motor-side lip seal 82a2 is disposed outward in the radial direction of the annular attachment unit 82a.

In addition, motor-side lip seals 82a1 and 82a2 are elastically deformed in the insertion direction of the external connector CN into the connector member 60 in a state in which the grommet member 80 is attached to the gear case 31, that is, in an engagement state of the notch holes 81b1 with the engagement claws 33b1 and is caused to tightly adhere the cover member 70 attached to the gear case 31. More specifically, the pair of motor-side lip seals 82a1 and 82a2 are sandwiched with slight elastic deformation between the annular main body 81a and the connector cover unit 71. In this manner, the pair of motor-side lip seals 82a1 and 82a2 sufficiently exhibit sealing performance.

Here, the stoppers 81c are caused to abut on the stopper walls 33b2 and the amount of movement of the grommet member 80 with respect to the gear case 31 along the axial direction of the output shaft 32f is restricted when the grommet member 80 is attached to the gear case 31. Therefore, a large load is prevented from being imparted on and damaging the pair of motor-side lip seals 82a1 and 82a2.

In addition, since the pair of motor-side lip seals 82a1 and 82a2 are elastically deformed in the state in which the grommet member 80 is attached to the gear case 31, backlash of the notch holes 81b1 with respect to the engagement claws 33b1 is curbed due to an elastic force of the motor-side lip seals 82a1 and 82a2. Therefore, the motor device 10 with excellent silence is realized.

Further, the pair of motor-side lip seals 82a1 and 82a2 are caused to tightly adhere the front side of the connector cover unit 71 as illustrated in FIG. 17, and the connector cover unit 71 is smoothed without distortion by providing the wide width unit 71d (see FIG. 12). Therefore, it is possible to sufficiently exhibit sealing performance.

In addition, an annular flange 82b projecting outward in the radial direction of the grommet main body 82 is integrally provided on the other side (the upper side in the drawing) of the grommet main body 82 in the axial direction. The annular flange 82b is formed into an annular and substantially flat plate shape, and the pair of bracket-side lip seals 82b1 and 82b2 are provided at the annular flange 82b on the side of the bracket BR. Here, one of the pair, namely the bracket-side lip seal 82b1 is disposed inward in the radial direction of the annular flange 82b, and the other bracket-side lip seal 82b2 is disposed outward in the radial direction of the annular flange 82b.

In addition, the bracket-side lip seals 82b1 and 82b2 are elastically deformed into the insertion direction of the external connector CN into the connector member 60 and is caused to tightly adhere to the bracket BR to which the gear case 31 is secured, in the state in which the motor device 10 is attached to the bracket BR. More specifically, the pair of bracket-side lip seals 82b1 and 82b2 are brought into contact with the bracket BR with slight elastic deformation. In this manner, the pair of bracket-side lip seals 82b1 and 82b2 sufficiently exhibit sealing performance.

Here, a deformation margin of the grommet main body 82 in the axial direction between the bracket BR and the securing member 81 (annular main body 81a) is about 5.0 mm. Therefore, the pair of bracket-side lip seals 82b1 and 82b2 are pressed against the bracket BR with the elastic force of the grommet main body 82. Therefore, it is possible to obtain sufficient sealing performance between the grommet main body 82 and the bracket BR as well similarly to that between the grommet main body 82 and the cover member 70 (connector cover unit 71).

However, the elastic force of the grommet main body 82 is set to such an elastic force with which the pair of motor-side lip seals 82a1 and 82a2 are not further elastically deformed (are not further collapsed). Therefore, excessive collapsing of the pair of motor-side lip seals 82a1 and 82a2 and backlash of the notch holes 81b1 with respect to the engagement claws 33b1 are curbed.

In this manner, both the pair of motor-side lip seals 82a1 and 82a2 and the pair of bracket-side lip seals 82b1 and 82b2 are sealed with elastic deformation in the attachment direction of the motor device 10 with respect to the bracket BR (the axial direction of the output shaft 32f). In this manner, both the pair of motor-side lip seals 82a1 and 82a2 and the pair of bracket-side lip seals 82b1 and 82b2 can sufficiently exhibit sealing properties merely by assembling the motor device 10 and securing the motor device 10 to the bracket BR. Therefore, large variations in sealing properties in the respective products are prevented even if how the assembly is made and the like vary in the respective products.

Next, a procedure for assembling the motor device 10 formed as described above will be described in detail with reference to drawings.

FIG. 18 is a perspective view for explaining a procedure for attaching the motor unit to the gear case, FIG. 19 is a perspective view for explaining a procedure for connecting the brush-side driving conductive member to the substrate-side driving conductive member, FIG. 20 is a perspective view for explaining a procedure for storing the connector member and the control substrate in the gear case, FIG. 21 is a perspective view illustrating a secured jig at which the gear case is set, FIG. 22 is a perspective view illustrating a movable jig at which the control substrate is set, FIG. 23 is a perspective view for explaining operations of an automatic assembly device, FIG. 24 is a sectional view for explaining operations of the laser welding device, and FIG. 25 is a perspective view for explaining a procedure for attaching the grommet member to the gear case.

[Process for Attaching Motor Unit to Gear Case]

First, the motor unit 20 assembled in advance in another assembly process is prepared, and the gear case 31 produced in advance in another producing process is prepared, as illustrated in FIG. 18. Then, the worm gear 29 side of the motor unit 20 is caused to face a side portion of the gear case 31 as represented by the arrow M8. Also, the motor unit 20 is caused to move toward the gear case 31, and the worm gear 29 is inserted into the gear case 31 through an insertion hole (not illustrated) provided in the side portion of the gear case 31. In this manner, the worm gear 29, the bearing holding tube 42, the terminal A, the terminal D, and the like enter the inside of the gear case 31.

Also, if the operation of attaching the motor unit 20 to the gear case 31 further proceeds, the terminal A and the terminal D are pinched between and electrically connected to the tip-split-shaped terminals 33g1 and 33h1 of the pair of substrate-side driving conductive members 33g and 33h incorporated as the conductive member unit UT in the gear case 31 as illustrated in FIG. 19. In this manner, connection between the brush holder 40 of the motor unit 20 and the conductive member unit UT of the gear case 31 is completed.

Thereafter, the motor unit 20 is caused to abut on the side portion of the gear case 31. Then, the motor unit 20 is secured to the gear case 31 with three fastening screws S (see FIG. 1) using an assembly jig (not illustrated) such as a screwdriver. In this manner, the process for attaching the motor unit 20 to the gear case 31 is completed.

Next, the worm wheel 32c (see FIG. 1) and the like are stored inside the gear storage unit 32 of the gear case 31, and the tooth unit of the worm wheel 32c is engaged with the worm gear 29 (see FIG. 1), as represented by the arrow M9 in FIG. 20 in the embodiment. In this manner, the deceleration mechanism SD (see FIG. 1) is stored inside the gear case 31, and the storage of the mechanical components in the gear case 31 is completed. Then, the disk cover 32e is attached to the opening 32d (see FIG. 9) of the gear storage unit 32 to block the opening 32d.

Also, the operation of storing the worm wheel 32c and the like in the gear storage unit 32 can be performed at an arbitrary timing after the aforementioned [Process for attaching motor unit to gear case]. For example, the operation of storing the worm wheel 32c and the like in the gear storage unit 32 can be performed at last in a plurality of processes for assembling the motor device 10.

[Process for Storing Connector Member and Control Substrate in Gear Case]

Next, the control substrate 50 and the connector member 60 produced in advance in other producing processes are prepared as illustrated in FIG. 20. First, the connector member 60 is stored in the connector storage unit 33d in the axial direction of the output shaft 32f (see FIG. 1) as represented by the arrow M10. Subsequently, the control substrate 50 is stored in the substrate storage unit 33c in the axial direction of the output shaft 32f as represented by the arrow M11.

At this time, the pair of first elastic deformation terminals 33g2 and 33h2 provided at the gear case 31 are respectively caused to face the first drive current through-holes TH1 provided in the control substrate 50 and are inserted straight into the first drive current through-holes TH1. Also, the plurality of second and third elastic deformation terminals 62a, 63a, and 64a provided at the connector member 60 are respectively caused to face the second drive current through-holes TH2 and the control current through-hole TH3 provided in the control substrate 50 and are inserted straight into the second drive current through-holes TH2 and the control current through-hole TH3.

Then, the respective elastic deformation terminals 33g2, 33h2, 62a, 63a, and 64a are inserted into the respective through-holes TH1, TH2, and TH3 with elastic deformation as represented by the dashed line circle in FIG. 20. In this manner, the brush holder 40 (see FIG. 3) and the connector member 60 are electrically connected to each other via the control substrate 50. In this manner, the process for storing the connector member 60 and the control substrate 50 in the gear case 31 is completed.

Here, it is necessary to carefully perform the operation of inserting the respective elastic deformation terminals 33g2, 33h2, 62a, 63a and 64a into the through-holes TH1, TH2, and TH3, that is, an electrical connecting operation such that the respective elastic deformation terminals 33g2, 33h2, 62a, 63a, and 64a are not damaged. Thus, it is possible to realize precise assembly with a high yield using the automatic assembly device 200 illustrated in FIGS. 21 to 23 in the embodiment. Hereinafter, a structure of the automatic assembly device 200 will be described in detail with reference to drawings.

As illustrated in FIGS. 21 to 23, the automatic assembly device 200 includes a secured jig 210 that is secured to a base (not illustrated) and a movable jig 220 that can be lifted and lowered (can be caused to approach and separated from) with respect to the secured jig 210.

The secured jig 210 includes a secured main body 211 formed into substantially a square plate shape as illustrated in FIG. 21. The gear case 31 is placed on the upper surface 211a of the secured main body 211, and a gear case platform (housing holding unit) 211b that holds the gear case 31 at a predetermined position is provided. Also, the upper surface 211a is directed to the side of the movable jig 220, and the gear case platform 211b projects at a predetermine height from the upper surface 211a toward the movable jig 220.

Also, an output shaft protection recessed portion 211c is provided in the vicinity of the gear case platform 211b on the upper surface 211a. The output shaft protection recessed portion 211c is provided such that the output shaft protection recessed portion 211c is recessed at a predetermined depth from the upper surface 211a. Also, the output shaft 32f (see FIG. 1) is stored in the output shaft protection recessed portion 211c in a state in which the gear case 31 is set in the gear case platform 211b.

Further, a total of three projecting units 211d are provided in the periphery of the output shaft protection recessed portion 211c in the upper surface 211a. The projecting units 211d have higher projecting heights than that of the gear case platform 211b and project from the upper surface 211a toward the movable jig 220. Also, the three projecting units 211d are inserted into attachment tubes 32g (see (b) of FIG.

1) of the gear case 31 in the state in which the gear case 31 is set at the gear case platform 211*b*.

Also, a pair of motor support units 211*e* that supports the motor unit 20 are provided in the vicinity of the gear case platform 211*b* in the upper surface 211*a*. The motor support units 211*e* are made of an elastic rubber material, for example, and support the planar walls 21*a* (see FIG. 2) of the motor unit 20 in the state in which the gear case 31 is set at the gear case platform 211*b*. In other words, the pair of motor support units 211*e* function as a cushion material for the motor unit 20.

In this manner, the secured jig 210 supports the motor device 10 formed as a sub-assy after the aforementioned [Process for attaching motor unit to gear case] is ended in parallel without causing any backlash.

The movable jig 220 includes a movable main body 221 formed into substantially a square plate shape, and a substrate holding unit 221*b* that adsorption-holds the control substrate 50 (see FIG. 10) is provided in a lower surface 221*a* of the movable main body 221 as illustrated in FIG. 22. Also, the lower surface 221*a* is directed to the side of the secured jig 210, and the substrate holding unit 221*b* is caused to project at a predetermined height from the lower surface 221*a* toward the secured jig 210.

Also, a plurality of negative pressure passages 221*c* to which a negative pressure source (not illustrated) that adsorbs the control substrate 50 is connected is provided at the substrate holding unit 221*b*. Further, a pair of short positioning pins (substrate pins) 221*d* are provided at the substrate holding unit 221*b*, and the short positioning pins 221*d* project toward the secured jig 210. Also, the pair of short positioning pins 221*d* are inserted into the positioning holes 53*a* and 54*a* (see FIG. 10) of the control substrate 50, respectively, and the movable jig 220 thus precisely holds the control substrate 50 at a predetermined position. Also, the projecting height of the pair of short positioning pins 221*d* from the lower surface 221*a* is h1 that is substantially equal to the plate thickness dimension of the movable main body 221.

Further, the pair of long positioning pins (connector pin) 221*e* are provided in the vicinity of the substrate holding unit 221*b* at the lower surface 221*a*. The long positioning pins 221*e* project toward the secured jig 210. Also, the pair of long positioning pins 221*e* are inserted into the pair of positioning holes 61*b* (see FIG. 11) of the connector member 60 when the movable jig 220 is lowered with respect to the secured jig 210. In this manner, it is possible to precisely position the connector member 60 at a predetermined position with no backlash with respect to the connector storage unit 33*d* (see FIG. 9) of the gear case 31. Also, the projecting height of the pair of long positioning pins 221*e* from the lower surface 221*a* is h2 that is larger than the plate thickness dimension of the movable main body 221 and is larger than the projecting height h1 of the short positioning pins 221*d* (h2>h1).

Also, in order to perform the aforementioned [Process for storing connector member and control substrate in gear case], the motor device 10 formed as a sub-assy after the aforementioned [Process of attaching motor unit to gear case] is ended is set at the upper surface 211*a* of the secured jig 210 first as represented by the arrow M12 in FIG. 23. At this time, the gear case 31 is placed on the gear case platform 211*b*, the three projecting units 211*d* (see FIG. 21) are respectively inserted into the three attachment tubes 32*g* (see (b) of FIG. 1), and the planar walls 21*a* (see FIG. 2) of the motor unit 20 are placed on the pair of motor support units 211*e*.

Next, the connector member 60 is stored in the connector storage unit 33*d* of the gear case 31 as represented by the arrow M13. Here, the connector member 60 is in a state in which slight backlash has occurred with respect to the connector storage unit 33*d* in a state in which only the connector member 60 is stored in the connector storage unit 33*d* (the state in FIG. 23). In other words, the connector member 60 is in a state in which the connector member 60 is temporarily stored in the connector storage unit 33*d*.

Next, the negative pressure source (not illustrated) of the automatic assembly device 200 is driven such that the control substrate 50 is adsorbed to (held by) the substrate holding unit 221*b* of the movable jig 220 as represented by the arrow M14. Thereafter, the movable jig 220 is lowered to approach the secured jig 210 as represented by the arrow M15.

Then, after the movable jig 220 moves by a first movement distance (short distance), the pair of long positioning pins 221*e* are inserted into the pair of positioning holes 61*b* of the connector member 60. In this manner, the connector member 60 is precisely positioned at a proper position with respect to the connector storage unit 33*d*, and the process (first process) for positioning the connector member 60 with respect to the connector storage unit 33*d* is completed.

Next, the movable jig 220 is caused to move by a second movement distance (long distance) that is longer than the first movement distance, and the movable jig 220 is caused to further approach the secured jig 210. In this manner, the through-holes TH1, TH2, and TH3 (see FIG. 10) of the control substrate 50 are disposed immediately above the respective elastic deformation terminals 33*g*2, 33*h*2, 62*a*, 63*a*, and 64*a* (see FIG. 8) that have been precisely positioned with respect to the secured jig 210.

Thereafter, the respective elastic deformation terminals 33*g*2, 33*h*2, 62*a*, 63*a*, and 64*a* are inserted into the through-holes TH1, TH2, and TH3 with elastic deformation by causing the movable jig 220 to further approach the secured jig 210. At this time, the pair of short positioning pins 221*d* of the movable jig 220 are respectively inserted into the pair of pin receiving holes 33*k* of the substrate storage unit 33*c*.

Therefore, the control substrate 50 is precisely positioned at a proper position with respect to the substrate storage unit 33*c*, and the respective elastic deformation terminals 33*g*2, 33*h*2, 62*a*, 63*a*, and 64*a* are electrically connected to the through-holes TH1, TH2, and TH3 of the control substrate 50 without being damaged. In this manner, the process (second process) for positioning the control substrate 50 with respect to the substrate storage unit 33*c* is completed.

In this manner, the aforementioned [Process for storing connector member and control substrate in gear case] is precisely performed by the automatic assembly device 200.

[Process for Attaching Cover Member to Gear Case]

Next, the cover member 70 is temporarily attached to the opening 33*e* of the electric component storage unit 33 in the gear case 31 as represented by the arrow M16 in FIG. 24. At this time, the inward side of the wide width unit 71*d* of the cover member 70 is caused to abut on the short side unit 61*a*1 of the connector connecting unit 61*a*, and the attachment projecting unit 72*a* (see (b) of FIG. 12) of the cover member 70 is fitted into the side wall 33*b* of the substrate storage unit 33*c* as illustrated in FIG. 14.

Thereafter, a laser welding operation is performed as illustrated in FIG. 25. Specifically, the cover member 70 is welded at the gear case 31 using a laser welding device 300.

The laser welding device 300 includes a pressing member 301 formed into substantially a flat plate shape. The pressing member 301 is adapted to press the cover member 70 with a pressing force f and is freely lifted and lowered with respect to the cover member 70 set at the gear case 31. Also, the pressing member 301 is formed of acrylic glass, for example, that is a transparent material with transmittance of 99% or the like and has strength to some extent. In this manner, the pressing member 301 can allow the laser beam LS to be transmitted therethrough and press the cover member 70.

Further, the laser welding device 300 includes a laser light source 302 for emitting the laser beam LS. The laser light source 302 is secured to the upper side of the pressing member 301 via a pillar (not illustrated), and a movable mirror (not illustrated) for causing a position irradiated with the laser beam LS to move is incorporated in the laser light source 302. In other words, the laser welding device 300 is a laser welding device of a so-called Galvano-scanning scheme. In addition, the position irradiated with the laser beam LS is caused to move above the pressing member 301 represented by the arrow M17 by controlling the movable mirror. Specifically, the position irradiated with the laser beam LS is moved to trace the upper side of the first securing unit 71b and the second securing unit 72b (see FIG. 13) provided in the periphery of the cover member 70.

Also, the laser light source 302 is driven as illustrated in FIG. 25 in order to weld the cover member 70 at the gear case 31. Then, the laser beam LS is transmitted through the transparent pressing member 301, and the first securing unit 71b and the second securing unit 72b in the periphery of the cover member 70 are irradiated therewith. Thereafter, the laser beam LS with which the first securing unit 71b and the second securing unit 72b are irradiated is transmitted through the white (light color) cover member 70 and then reaches the black (dark color) case-side wielding unit 33f.

Then, the case-side welding unit 33f is heated to a high temperature and is then melted. Therefore, the high temperature of the case-side welding unit 33f is transmitted to the first securing unit 71b and the second securing unit 72b, and a part of the first securing unit 71b and the second securing unit 72b is also melted. In this manner, a contact portion between the cover member 70 and the gear case 31 serves as a welded portion WP as represented by the circle of the dashed line in FIG. 25, and structures of the cover member 70 and the gear case 31 are integrated (fixed). In this manner, the process for attaching the cover member 70 to the gear case 31 is completed.

Also, since the laser welding device of the Galvano-scanning scheme is employed in the embodiment, only the movable mirror is a movable portion, and only a small inertial mass of the movable portion is required. Therefore, it is possible to quickly and precisely control the position irradiated with the laser beam LS. Therefore, it is possible to precisely perform welding in short time even in a case in which the length of the welded portion is long. In a case in which the position irradiated with the laser beam LS has a peripheral shape as in the embodiment, in particular, it is possible to end the welding operation before the welded portion that is irradiated with the laser beam LS first is cured. Therefore, it is possible to effectively curb occurrence of distortion when the welded portion is cured.

[Process for Attaching Grommet Member to Gear Case]

Next, the grommet member 80 is attached to the gear case 31 to which the cover member 70 is attached as represented by the arrow M18 in FIG. 24. Specifically, the side of the three securing legs 81b of the grommet member 80 is caused to face the connector storage unit 33d portion of the gear case 31. At this time, the three securing legs 81b and the three engagement claws 33b1 disposed in the periphery of the connector storage unit 33d are aligned. Thereafter, the grommet member 80 is caused to further move toward the gear case 31, and the notch holes 81b1 of the three securing legs 81b are hooked at the three engagement claws 33b1.

Also, in order to hook the notch holes 81b1 at the engagement claws 33b1, the pair of stoppers 81c of the grommet member 80 are caused to abut on the pair of stopper walls 33b2 disposed in the periphery of the connector storage unit 33d. In this manner, the process for attaching the grommet member 80 to the gear case 31 is completed, and the operation of assembling the motor device 10 is completed.

According to the motor device 10 in the embodiment, the connector storage unit 33d and the substrate storage unit 33c provided in the gear case 31 are opened in the direction that intersects the axial direction of the armature shaft 25 (the axial direction of the output shaft 32f) as described above in detail. In this manner, the connector member 60 and the control substrate 50 are stored in the connector storage unit 33d and the substrate storage unit 33c, which have a relatively large opening portion (opening 33e), in the same direction when the motor device 10 is assembled. Therefore, it is possible to visually observe the state of assembly of the motor device 10 from the outside and to easily and definitively assemble the motor device 10.

Also, according to the motor device 10 in the embodiment, the first and second substrate-side driving conductive members 33g and 33h are provided at the gear case 31, the first and second power source-side driving conductive members 62 and 63 and the control conductive member 64 are provided at the connector member 60, the first elastic deformation terminals 33g2 and 33h2 of the first and second substrate-side driving conductive members 33g and 33h, to which the control substrate 50 is connected, and the second and third elastic deformation terminals 62a, 63a, and 64a of the first and second power source-side driving conductive members 62 and 63 and the control conductive member 64, to which the control substrate 50 is connected, extend in the direction that intersects the axial direction of the armature shaft 25.

In this manner, it is possible to easily electrically connect the first elastic deformation terminals 33g2 and 33h2 and the second and third elastic deformation terminals 62a, 63a, and 64a to each other via the control substrate 50 merely by storing the control substrate 50 in the substrate storage unit 33c.

Further, according to the motor device 10 in the embodiment, the first elastic deformation terminals 33g2 and 33h2 and the second and third elastic deformation terminals 62a, 63a, and 64a are inserted into the respective through-holes TH1, TH2, and TH3 of the control substrate 50 with elastic deformation.

In this manner, it is possible to make the connecting operation such as soldering unnecessary and to definitively establish electrical connection therebetween. Therefore, it is possible to reduce the number of processes for assembly and to reduce costs.

Also, the method for producing the motor device 10 in the embodiment includes the positioning process (first process) for positioning the connector member 60 with respect to the connector storage unit 33d and the positioning process (second process) for inserting the first elastic deformation terminals 33g2 and 33h2 and the second and third elastic deformation terminals 62a, 63a, an 64a into the respective through-holes TH1, TH2, and TH3 of the control substrate 50 with elastic deformation to position the control substrate 50 with respect to the substrate storage unit 33c.

In this manner, it is possible to precisely and definitively assemble the motor device 10.

Further, according to the method for producing the motor device 10 in the embodiment, the automatic assembly device 200 that has the secured jig 210 and the movable jig 220 is used, the gear case platform 211b that holds the gear case 31 at a predetermined position is provided at the secured jig 210, the long positioning pins 221e that position the connector member 60 at a predetermined position with respect to the connector storage unit 33d and the short positioning pins 221d that hold the control substrate 50 at a predetermined position and are shorter than the long positioning pins 221e are provided at the movable jig 220, the movable jig 220 is caused to move by a short distance, the long positioning pins 221e are inserted into the positioning holes 61b, the movable jig 220 is caused to further move, and the short positioning pins 221d are inserted into the pin receiving holes 33k.

In this manner, the respective elastic deformation terminals 33g2, 33h2 62a, 63a, and 64a are inserted into the through-holes TH1, TH2, and TH3 with elastic deformation merely by causing the movable jig 220 to move and approach the secured jig 210, inserting the long positioning pins 221e into the positioning holes 61b, and inserting the short positioning pins 221d into the pin receiving holes 33k. Therefore, it is possible to more precisely, automatically, and definitively assemble the motor device 10.

Also, according to the method for producing the motor device 10 in the embodiment, the first and second substrate-side driving conductive members 33g and 33h are incorporated in the gear case 31 through insert molding, and the first and second power source-side driving conductive members 62 and 63 and the control conductive member 64 are incorporated in the connector member 60 through insert molding.

Therefore, it is possible to improve precision of positions of the first and second substrate-side driving conductive members 33g and 33h with respect to the gear case 31 and precision of positions of the first and second power source-side driving conductive members 62 and 63 and the control conductive member 64 with respect to the connector member 60. Therefore, it is possible to precisely and definitively perform an operation of establishing electrical connection of the control substrate 50 and to improve a yield.

It is a matter of course that the invention is not limited to the aforementioned embodiment and various modifications can be made without departing from the gist thereof. For example, the embodiment in which the motor device 10 is used as a drive source for a power window device mounted in a vehicle has been described above, the invention is not limited thereto and can also be used as another drive source for a sunroof device or the like.

Also, although the embodiment in which an electric motor with a brush is employed for the motor unit 20 has been described above, the invention is not limited thereto, and a brushless electric motor or the like can also be employed for the motor unit.

In addition, materials, shapes, dimensions, numbers, placement locations, and the like of the respective components in the embodiment can arbitrarily be changed as long as it is possible to achieve the invention and are not limited to those in the aforementioned embodiment.

INDUSTRIAL APPLICABILITY

The motor device is used as a drive source for a power window device or the like mounted in a vehicle such as a car to drive an opening/closing body such as a window glass to open and close the opening/closing body.

What is claimed is:

1. A method for producing a motor device that comprises a deceleration mechanism configured to decelerate rotation of a rotation shaft,
    in which the motor device comprises
        a housing configured to store the deceleration mechanism and configured such that a height dimension along a direction that intersects an axial direction of the rotation shaft is smaller than a width dimension along the axial direction of the rotation shaft,
        a connector storage unit provided in the housing and configured to store a connector member to which an external connector is connected, and
        a substrate storage unit provided in the housing and configured to store a control substrate configured to control rotation of the rotation shaft,
    the connector storage unit and the substrate storage unit are opened in the direction that intersects the axial direction of the rotation shaft,
    the housing is provided with a motor-side conductive member, and the connector member is provided with a connector-side conductive member, and
    a first terminal of the motor-side conductive member is connected to the control substrate, and a second terminal of the connector-side conductive member is connected to the control substrate, and the first terminal and the second terminal extend in the direction that intersects the axial direction of the rotation shaft,
    the method comprising:
    a first process of positioning the connector member with respect to the connector storage unit; and
    a second process of inserting the first terminal and the second terminal into through-holes of the control substrate with elastic deformation and positioning the control substrate with respect to the substrate storage unit.

2. The method for producing a motor device according to claim 1,
    wherein a secured jig secured to a base and a movable jig configured to approach or separate from the secured jig are used in the first process and the second process,
    the secured jig is provided with a housing holding unit configured to hold the housing at a predetermined position,
    the movable jig is provided with a connector pin configured to position the connector member at a predetermined position with respect to the connector storage unit and a substrate pin configured to hold the control substrate at a predetermined position and configured to be shorter than the connector pin,
    the movable jig is caused to approach the secured jig and the connector pin is inserted into a connector hole provided in the connector member in the first process, and
    the movable jig is caused to further approach the secured jig and the substrate pin is inserted into a housing hole provided in the housing in the second process.

3. The method for producing a motor device according to claim 1,
    wherein the motor-side conductive member is incorporated in the housing through insert molding, and the connector-side conductive member is incorporated in the connector member through insert molding.

* * * * *